United States Patent [19]
Hanaya et al.

[11] Patent Number: 5,754,258
[45] Date of Patent: May 19, 1998

[54] PROGRAM SWITCHING DEVICE AND METHOD

[75] Inventors: Hiroyuki Hanaya, Saitama; Hirofumi Yuchi; Takaaki Ohta, both of Kanagawa, all of Japan

[73] Assignee: Sony Corporation, Tokyo, Japan

[21] Appl. No.: 515,659

[22] Filed: Aug. 16, 1995

[30] Foreign Application Priority Data

Aug. 16, 1994 [JP] Japan ................... 6-215339
Dec. 27, 1994 [JP] Japan ................... 6-324967

[51] Int. Cl.$^6$ .......................... H04N 7/173; H04N 5/76
[52] U.S. Cl. .......................... 348/734; 348/906; 348/13; 348/569; 455/5.1
[58] Field of Search .................. 348/906, 9, 12, 348/13, 7, 563, 569, 570, 586, 589, 596, 734, 468, 461; 455/4.2, 5.1, 6.1, 6.2; H04N 7/173, 5/76

[56] References Cited

U.S. PATENT DOCUMENTS

| | | | |
|---|---|---|---|
| 5,182,640 | 1/1993 | Takano . | |
| 5,257,106 | 10/1993 | Maruoka . | |
| 5,353,121 | 10/1994 | Young et al. | 348/563 |
| 5,559,550 | 9/1996 | Mankovitz | 348/6 |
| 5,579,055 | 11/1996 | Hamilton et al. | 348/476 |
| 5,583,560 | 12/1996 | Florin et al. | 348/13 |

FOREIGN PATENT DOCUMENTS

| | | | |
|---|---|---|---|
| 401930 | 12/1990 | European Pat. Off. | H04N 5/76 |
| 447968 | 9/1991 | European Pat. Off. | H04N 7/087 |
| 536901 | 4/1993 | European Pat. Off. | H04N 5/445 |
| 15507 | 12/1990 | WIPO | H04N 7/173 |

OTHER PUBLICATIONS

PCT Application No. WO 93/12611 (Chaney et al.).
Patent Abstracts of Japan, No. JP 6054267 (Ishikawa et al.).
Patent Abstracts of Japan, No. JP 4319883 (Ito).
IEEE 1992 International Conference on Consumer Electronics (Nael).

*Primary Examiner*—Glenton B. Burgess
*Attorney, Agent, or Firm*—Jay H. Maioli

[57] ABSTRACT

A program switching device and a method thereof which can prevent a disorder of images and an invisible state of the image when a channel (program) is switched. When it is instructed to switch a program to the other program in the state where the image of a program of a predetermined channel is displayed, at step SP111, the image of the program currently received is converted into a static image to mute the sound. Then, at step SP212, the receiving processing of channel is started after switching. At step SP113, the process waits until the processing of channel switching is terminated, and when it is terminated, the static image set at step SP111 and the mute are released at step SP114.

25 Claims, 25 Drawing Sheets

FIG. 17

| OTHER GUIDES 1 | GENERAL GUIDE 2 | OTHER LISTS 3 |
| --- | --- | --- |
| SPORTS GUIDE 4 | EXIT 5 | MOVIE LIST 6 |
| ATTRACTIONS / EVENTS 7 | FAV STATION GUIDE 8 | SYSTEM 9 |

FIG. 19

GENERAL GUIDE | SEP 21 SUN 9:37PM

| T/B/S |

FAVA
8:00PM-9:27PM
PG-13
SUN 233

TOP
REVIEW AND COUNTDOWN OF THE TOP 20 VIDEOS OF THE WEEK.
RATED BY BILBOARD MAGAZINE FOR THE WEEK ENDING AUGUST 31
HOSTED BY KENNEDY

9:30PM    10:00PM    10:30PM

TOON 227
USA 229
FAM 232
TBS 233 — 212
TNN 235
CMT 236
SCFI 240

5,754,258

PROGRAM SWITCHING DEVICE AND METHOD

FIELD OF THE INVENTION

This invention relates to a program switching device and a method thereof for use in receiving a digital television broadcast based on electronic program guide information which is, for example, broadcast via a satellite and in switching the broadcast channel program.

BACKGROUND OF THE INVENTION

Recently, a system is prevalent for digitalizing a television signal and transmitting the signal via a satellite such as a broadcasting satellite and a communication satellite and for receiving the signal at a remote location, such as a household. In such a system it is possible to secure or access, for example, approximately 200 channels. Thus it is possible to broadcast an extremely large amount of information.

However, when the switching of the received frequency and image decoding processing by, for example, a MPEG decoder is initiated after the user's select key operation, a desired received image will be displayed after time required for the synchronization and decoding processing has elapsed. Further, when the number of channels which can be received increases, the channel is frequently switched until the program (channel) received by the user is determined so that it takes time for synchronization and decoding processing for each switching of channels. This delay in actually receiving data can be a source of frustration for users.

Further, in addition to the aforementioned problem of response time, if the operation for switching channels is complicated, it becomes even more difficult to switch channels swiftly.

SUMMARY OF THE INVENTION

In view of the foregoing, an object of this invention is to provide a program switching device and a method thereof which allows users to select a desired program very swiftly with a simple operation by preliminarily initiating the receiving operation in accordance a cursor movement on a control display without waiting for the will determination of users.

The foregoing object and other objects of the invention have been achieved by the provision of a television signal receiver for receiving a television signal for a desired channel program and outputting the received signal.

The receiver includes a receiving means for receiving a television signal (for example, a front end 20, a demultiplexer 24, a MPEG video decoder 25, and a MPEG audio decoder 26, shown in FIG. 4); selection screen output means (for example, a guide button switch 143 shown in FIG. 5) which is operated at the time of outputting a selection screen signal for selecting a desired program out of a plurality of programs by moving a cursor; moving means (for example, a select button switch 131 shown in FIG. 5 which is directed and operated) which is operated at the time of moving the cursor; selection means (for example, a select button switch 131 shown in FIG. 5 which is selected and operated) which is operated at the time of selecting a program designated by the cursor; and control means (for example, CPU 29 shown in FIG. 4) for controlling the receiving means and receiving a program designated by the cursor before the operation of the selection means when the cursor is moved in correspondence to the operation of the moving means.

Further, the television signal receiver according to the present invention incorporates a receiving means for receiving a television signal of a desired channel (for example, a front end 20 shown in FIG. 4, a demultiplexer 24, a MPEG video decoder 25, and a MPEG audio decoder 26); display (for example, a monitor device 4 shown in FIG. 1) for displaying a program image of the program received by the receiving means; selection screen output means (for example, a guide button switch 143 shown in FIG. 5) which is operated at the time of outputting a selection screen signal for selecting a desired program out of a plurality of program by moving a cursor and displaying the signal on a display means; moving means (for example, a select button switch 131 shown in FIG. 5 which is directed and operated) which is operated at the time of moving the cursor; selection means (for example, a select button switch 131 shown in FIG. 5 which is selected and operated) which is operated at the time of selecting a program designated by the cursor; and control means (for example, CPU 29 shown in FIG. 4) for controlling the receiving means and receiving a program designated by the cursor before the operation of the selection means when the cursor is moved in correspondence to the operation of the moving means.

Further, the present invention further incorporate an audio signal output apparatus for outputting an audio signal of a program designated by the cursor which signal is received by the receiving means corresponding to the control of the control means before the operation of the selection means when the cursor is moved corresponding to the operation of the moving means.

When the selection on control screen output is operated, the selected screen is used as a window so that the screen is overlapped on the image received with receiving means.

Either of the horizontal axis and vertical axis of the selected screen is used as a channel axis while the other axis is used as a time axis. At a position designated by both axes, a button icon for selecting a program can be arranged in a matrix manner.

The cursor can be displayed, for example, by providing a predetermined button icon with a brightness or a color which is different from others.

The television signal receiver of the present invention can further comprise memory means (for example, an EPG area 35A shown in FIG. 4) for memorizing information associated with a display position of the button icon displayed on the selection screen which is broadcast as part of a television signal.

The television signal receiver of the present invention can further include a judging means, or circuitry, for judging whether or not a fee payment is required to receive a program designated by the cursor.

When a fee is charged when the program designated by the cursor is received, the television signal receiver of the present invention includes inhibiting circuitry (for example, step SP68 on the program shown in FIG. 22) for inhibiting the receiving of the program if no fee has been paid or reception is otherwise not authorized.

The receiving means provides demodulating means (for example, a front end 20 shown in FIG. 4) for demodulating a broadcast wave in which a carrier wave to which individual frequencies are assigned is multiplexed with digital images and sound information in a plurality of channels, an extracting means (for example, demultiplexer 24 shown in FIG. 4) for extracting a channel signal instructed by the control means from a signal demodulated from the demodulating means. When the control means switches a channel in the same carrier wave, the control means instructs the extraction of a predetermined channel to the extracting means. When the control means switches a channel between different carrier waves, the control means instructs to the demodulating means the switching of the frequency of the carrier wave and is capable of instructing the extraction of a predetermined channel to the extraction means.

The method for receiving the television signal according to the present invention wherein a television signal of a predetermined channel program is received at a receiving part, and the received signal is output, the method includes the steps of displaying a selection screen for selecting a predetermined program of a plurality of programs, moving a cursor to a predetermined position on the selection screen to designate a predetermined program, selecting a program designated by the cursor position, performing a selection operation when the display of the selected screen is suspended, and initiating the receiving operation of a program designated by the cursor prior to the selection operation when the cursor is moved.

The remote commander of the present invention refers to a remote commander for a television signal receiver for displaying a selection screen for selecting a predetermined program of the plurality of programs, and moving the cursor on the selection screen to a predetermined position in the movement operation to designate the predetermined program, and selecting a program designated by the cursor with the selection means, characterized by comprising operation means which allows executing the cursor movement operation and selection operation with one finger.

As described above, in accordance with the television signal receiver and a television signal receiving method of the present invention, when the cursor is moved on the selection screen, the program corresponding to the movement position is immediately received prior to the secured operation with the result that the switching of the program can be swiftly executed.

Further, in the remote commander in accordance with the present invention, since the movement (of the cursor) operation and the selection operation can be typically performed with one finger, the desired program can be swiftly and simply selected and secured out of many programs.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIG. 11 is a view illustrating a section of a memory area of a DRAM 25a;

FIG. 17 is a view showing a display example of a menu displayed at step SP23;

FIG. 19 is a view showing a display example of a general guide displayed at step SP25;

DETAILED DESCRIPTION OF THE EMBODIMENT

Preferred embodiments of this invention will be described with reference to the accompanying drawings.

Figure 1:
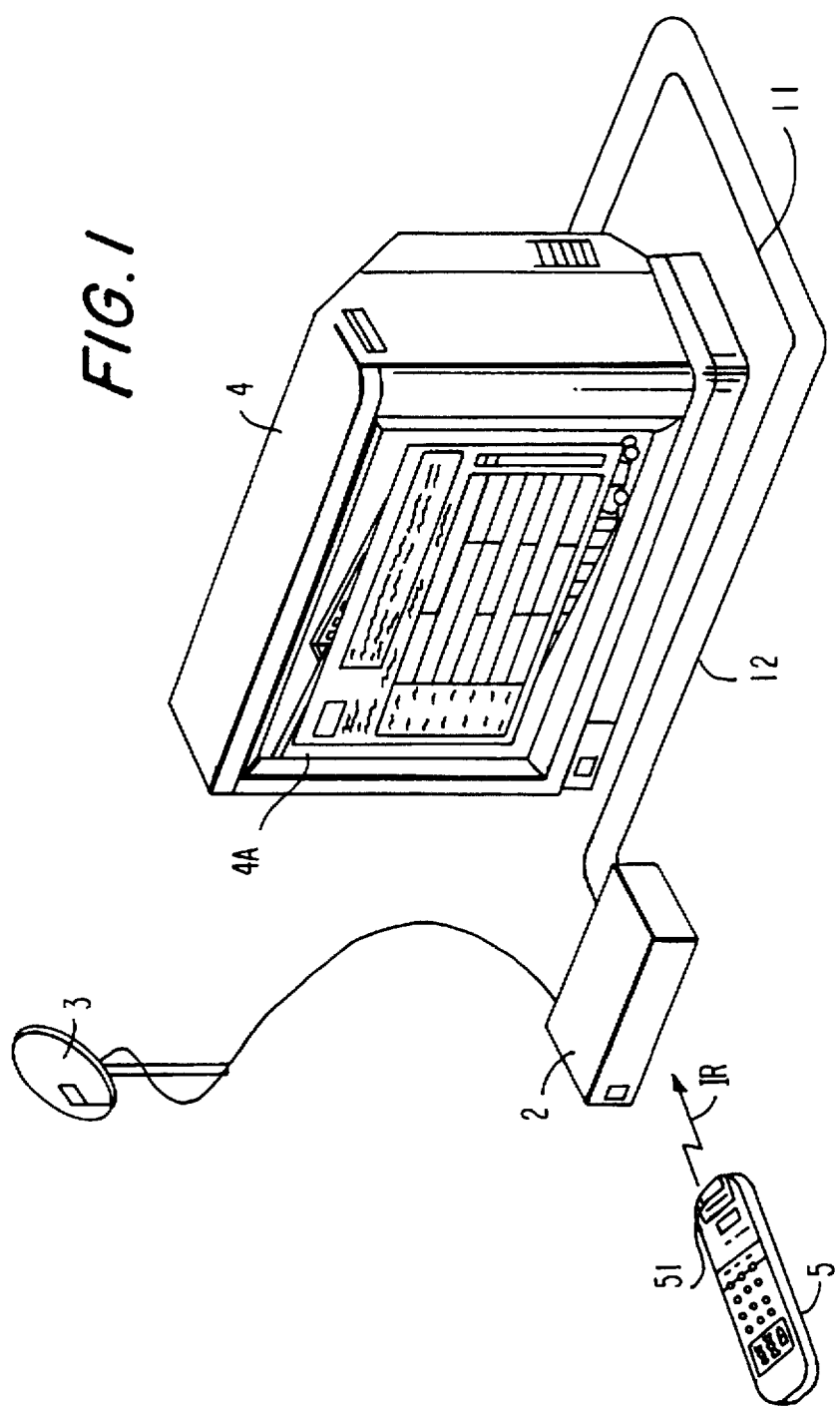
FIG. 1 is a perspective view showing a structure example of an AV system to which the present invention is applied.

FIG. 1 is a view showing a structure example of an AV (audio video) system to which the present invention is applied. In this embodiment, the AV system 1 comprises an IRD (integrated receiver/decoder) 2 for demodulating a signal received from a satellite not shown (a broadcasting satellite or a communication satellite) via a parabola antenna 3 and a monitor device 4. The monitor device 4 and the IRD 2 are connected to each other with an AV line 11 and a control line 12.

The AV system is constituted so that an instruction can be input to an IRD 2 by a remote commander 5 with infrared rays (IR) signal. In other words, when a predetermined button switch out of button switches 50 of the remote commander 5 is operated or actuated, the infrared rays signal corresponding to the button is emit from the IR sending part 51 and is received by the IR receiving part 39 (FIG. 4) of the IRD 2.

Figure 2:
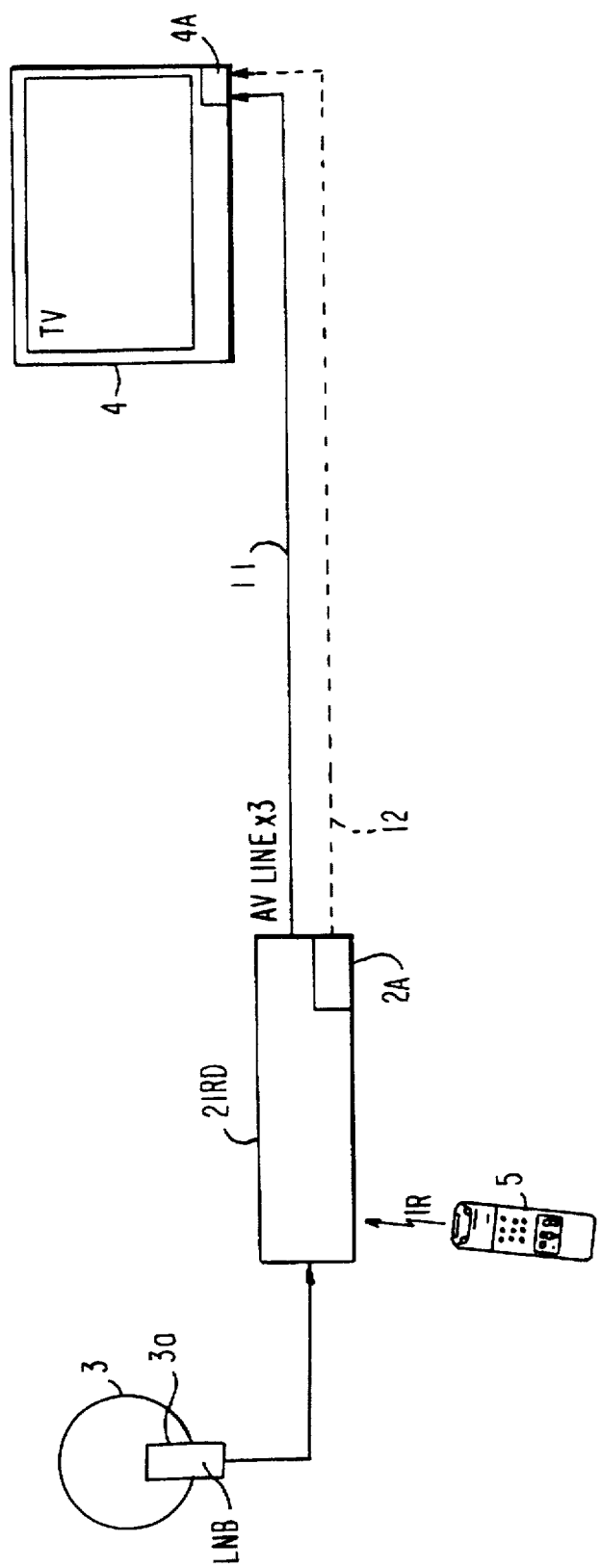
FIG. 2 is a block diagram showing a state of electric connection of an AV system.

FIG. 2 shows an electrical connection state of the AV system shown in FIG. 1. The parabola antenna 3 has an LNB (Low Noise Block Downconverter) 3a to convert a signal received from a satellite to a predetermined frequency signal and supply it to the IRD 2. The IRD 2 supplies the output to the monitor device 4 via an AV line 11 comprising, for example, a composite video signal line, an audio L (left channel) signal line, and an audio R (right channel) signal line.

Further, the IRD 2 has an AV device control signal sending and receiving part 2A, and the monitor device 4 has an AV device control signal sending and receiving part 4A respectively. These parts 2A and 4A are connected to each other with a control line 12 cursor line 12 mat be implemented by, for example, a wired SIRCS™ (Sony Infrared Remote Control System).

Figure 3:
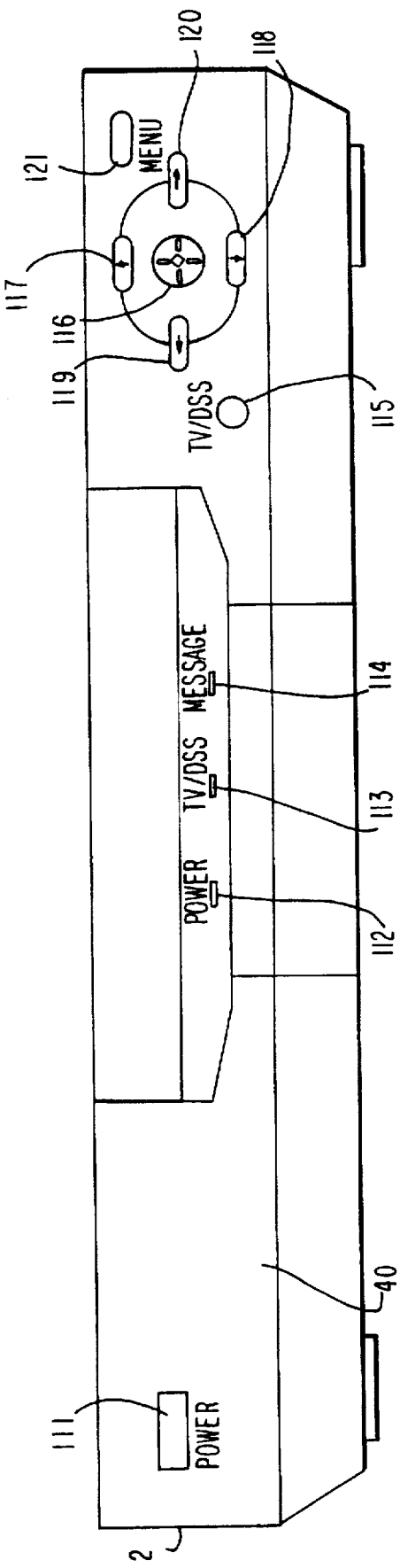
FIG. 3 is a front view showing a structure example of the front of an IRD 2.
Figure 4:
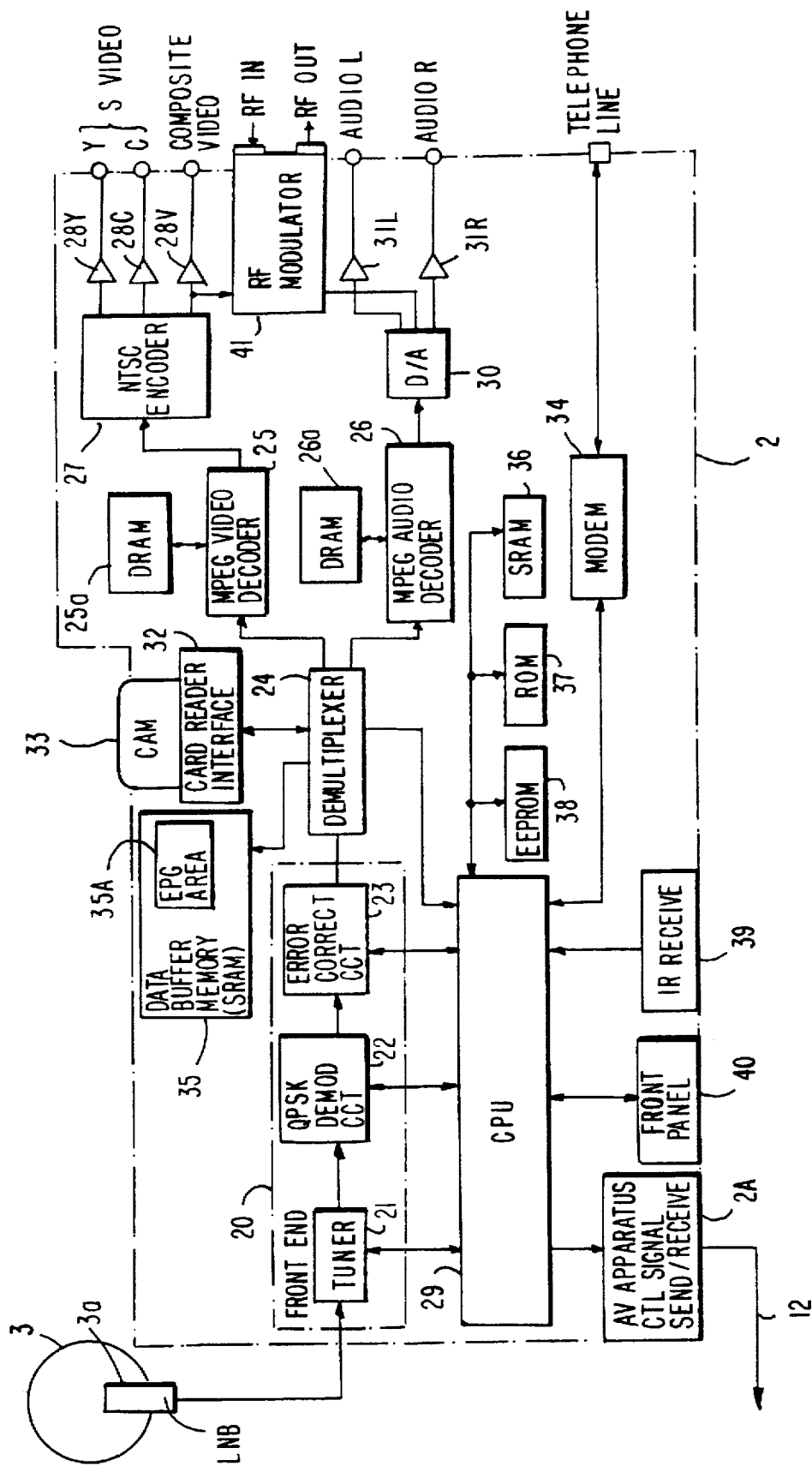
FIG. 4 is a block diagram showing a structure example showing the inside of the IRD 2.

FIG. 3 shows a structure example of the front of the IRD 2. On the left side of the IRD 2, a power source button switch 111 is provided. This power source button switch 111 is operated when the power is turned on or off. When the power is turned on, an LED 112 is lit. On the right side of the LED 112, LED's 113 and 114 are provided. The LED 113 is lit when a DSS (Digital Satellite System) mode is selected for receiving and outputting the signal (DSS) from the satellite. The LED is quenched (turned off) when a television mode is selected for outputting an RF signal input from the cable box to the RF input terminal from an RF output terminal via an RF modulator 41 (FIG. 4). The LED 114 is lit (turned on) when a predetermined message or signal is sent to the IRD 2 via the satellite. When the user output and display the message on the monitor device 4 for confirmation, the LED 114 is quenched.

When a TV/DSS button switch is turned on, a DSS mode is set. When the TV/DSS button switch is turned off, a TV mode is set. A menu button switch 121 is operated when the menu is displayed on the monitor device 4.

On up and down and right and left sides of a select button switch 116, an up button switch 117, a down button switch 118, a left button switch 119, and a right button switch 120 are arranged. The up button switch 117, the down button switch 118, the left button switch 119, and the right button switch 120 are operated when the cursor is moved in the up and down directions and in the left and the right directions. The select button switch 116 is operated when a selection is decided (selected)

FIG. 4 shows a structure example of the inside of the IRD 2 for receiving the aforementioned DSS. The RF signal output from the LNB3a of the parabola antenna 3 is supplied to the tuner 21 of the front end 20 for demodulation. The output from the tuner 21 is supplied to the QPSK demodulation circuit 22 and is QPSK demodulated. The output from the QPSK demodulation circuit 22 is supplied to the error correction circuit 23 so that an error is detected, corrected and amended when needed.

In a CAM (Conditional Access Module) 33 comprising an IC card composed of CPU, ROM and RAM, wherein a key required for decoding is stored together with a decoding program. Since the signal transmitted via the satellite is encoded, a key and a decoding treatment is required for decoding this code. Then, this key is read from the CAM 33 via a card reader interface 32 and is supplied to a demultiplexer 24. The demultiplexer 24 uses this key to decode the encoded signal.

Incidentally, this CAM 33 stores the key required for the decoding and decoding program, and moreover charged fee information or the like.

The demultiplexer 24 receiving an input of a signal output from the error correction circuit 23 in the front end 20, and temporarily memorized the input in a data buffer memory (SRAM; static random access memory) 35. Then the demultiplexer 24 reads this data occasionally and supplies the decoded video signal to the MPEG video decoder 25 and supplies the decoded audio signal to the MPEG audio decoder 26.

An MPEG video decoder 25 allows the input digital video signal to be recorded in the DRAM 25a properly thereby executing the decoding process of the video signal compressed by the MPEG method. The decoded video signal is supplied to the NTSC encoder 27 to be converted into a luminance signal (Y), a chroma signal (C) and a composite signal (V) in the NTSC method. The luminance signal and the chroma signal are output as an S video signal respectively via buffer amplifiers 28Y and 28C. In addition, the composite signal is output via a buffer amplifier 28V.

Incidentally, as this MPEG decoder 25, the MPEG 2 decoded LSI (STi3500) of SGS-Thomson Microelectronics, Inc. can be used. The outline is introduced by Martin Bolton in Nikkei Electronics, Mar. 1, 1994, (no. 603) pages 101 through 110, published by Nikkei BP Company.

Further, The Recent MPEG Textbooks, pages 231 through 253, published on Aug. 1st, 1994 by ASCII Company explains the MPEG2-Transportstream.

The MPEG audio decoder 26 allows the digital audio signal supplied from the demultiplexer 24 to be appropriately memorized in the DRAM26a thereby executing the decoding processing of the audio signal compressed by the MPEG method. The decoded audio signal is D/A converted at the D/A converter 30. The audio signal on the left channel is output via a buffer amplifier 31L while the audio signal on the right channel is output via a buffer amplifier 31R.

An RF modulator 41 converts a composite signal output by the NTSC encoder 27 and the audio signal output by the D/A converter 30 into an RF signal and is output therefrom. Further, when this RF modulator 41 sets the TV mode, the RF modulator inspects the RF signal of the NTSC method input from an AV apparatus such as a cable box to be output to the VCR or another AV apparatus as it is.

In the case of this embodiment, these video signals and audio signals are supplied to a monitor device 4 via an AV line 11.

The CPU (central processor unit) 29 executes each kind of processing in accordance with a program stored in the ROM 37. For example, the CPU 29 controls a tuner 21, a QPSK decoding circuit 22 and an error correction circuit 23. Further, the CPU 29 controls the AV apparatus control signal sending and receiving part 2A to output a predetermined control signal to other AV apparatuses via a control line 12. Further, the CPU 29 receives a control signal from other AV apparatuses.

It is possible to directly input a predetermined instruction by operating an operation button switch (FIG. 3) of the front panel 40 to the CPU 29. Further, when the remote commander 5 is operated, an infrared rays signal is emitted from an IR sending part 51. This infrared ray signal is received by the IR receiving part 39 so that the light receiving result is supplied to the CPU 29. Consequently, a predetermined instruction can be input to the CPU 29 also by operating the remote commander 5.

Further, the demultiplexer 24 incorporates an EPG data in addition to an MPEG video data and audio data supplied from a front end 20. The EPG data is supplied to and memorized in an EPG area 35A of the data buffer memory 35. The EPG information includes information on each of the broadcast channel programs from the present moment to tens of hours after (for example, program channel, broadcast time, title, category or the like). Since the EPG information is frequently transmitted, the EPG area 35A can always hold the most recent EPG. Further, the CPU prepares a sort table from the EPG data which is stored in the EPG area 35A and the sort table is memorized in an SRAM 36. The details will be described later.

An EEPROM (electrically erasable programmable read only memory) 38 appropriately memorizes data (for example, four week program receipt history of the tuner 21, the channel number received immediately before the source power is turned off (last channel) which is desired to be held after the source power is turned off. Then, for example, when the power source is turned on, the channel same as the last channel is received again. When the last channel is not memorized, the channel stored as a default in the ROM 37 is received. Further, the CPU 29 set in operation a minimum circuits such as the front end 20, the demultiplexer 24 and data buffer memory 35 even at the time of the power off of the power source when the sleep mode is set. The CPU 29 counts the current time from the time information included in the receiving signal thereby executing the control for allowing each circuit to perform a predetermined operation at a predetermined time. For example, the timer automatic recording is executed in association with the outside VCR.

Further, when it is desired that a predetermined OSD (On-Screen Display) data is generated, the CPU 29 controls the MPEG video decoder 25. The MPEG video decoder 25 generates a predetermined OSD data in correspondence to the control to write the data into the OSD area 25aA (FIG. 13) of the DRAM25a. Then the data is further read and output. This allows predetermined characters, figures (for example, a menu (FIG. 17)), and a general program guide (FIG. 19) to be output appropriately to a monitor device 4 to be displayed.

Figure 5:
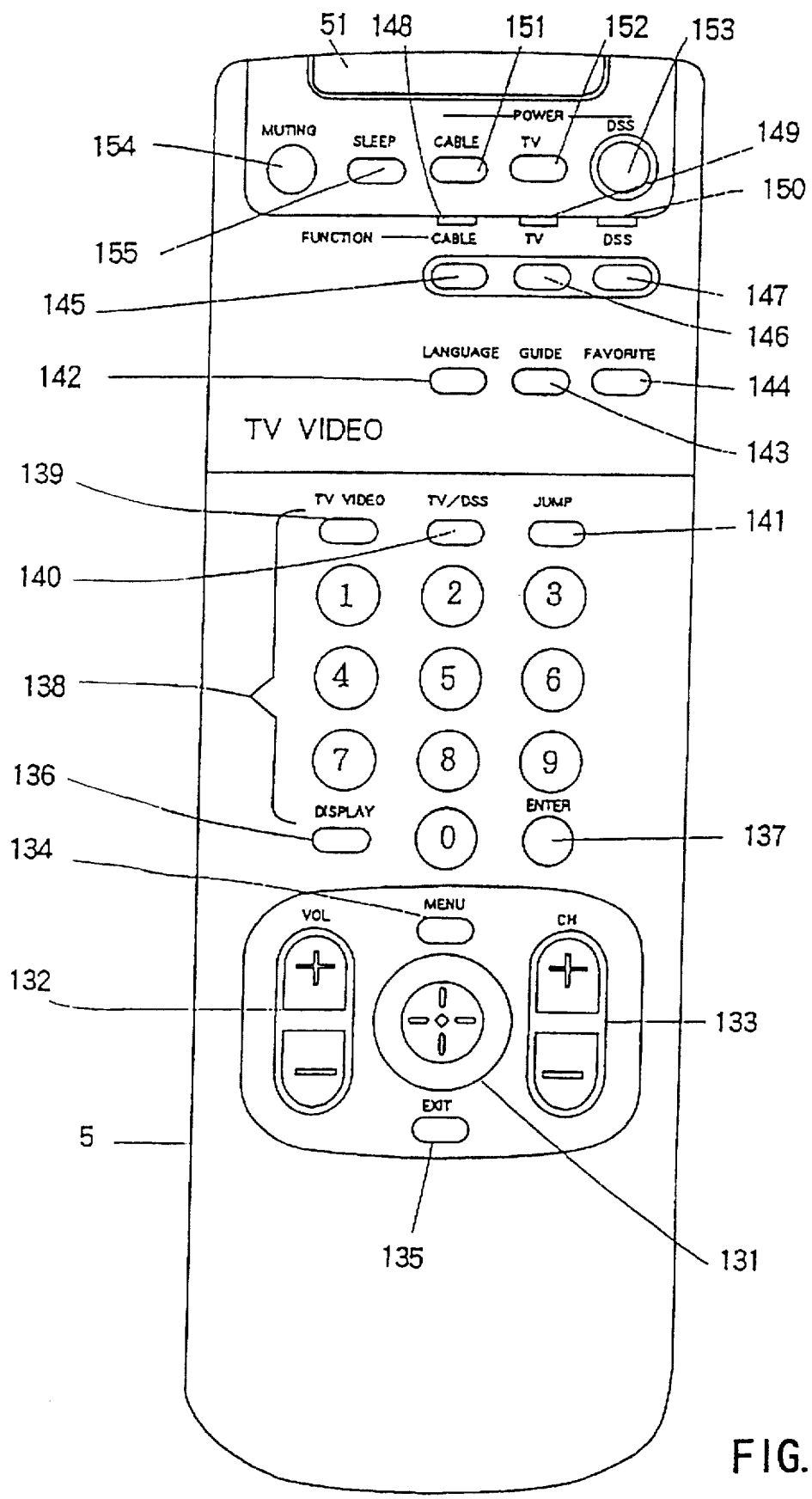
FIG. 5 is a plane view showing a structure example of an upper surface of a remote commander 5.

FIG. 5 shows a structure example of a button switch 50 of a remote commander 5. A select button switch 131 is not only capable of operating in eight directions, namely, up, down, right and left, and four diagonal directions between four basic directions. The select button switch 131 is also capable of pressing and operating (select operation) in the vertical direction with respect to the upper surface of the remote commander 5. A menu button switch 134 is operated when a menu screen is displayed on the monitor device 4. An exit button switch 135 is operated when returning to the original normal screen.

The channel up down button switch 133 is operated when a broadcast channel number to be received is up and down. The volume button switch 132 is operated when a volume is up or down.

A numeric button switch (ten key) switch 138 on which numbers 0 through 9 are displayed is operated when the displayed number is input. An enter button switch 137 is operated when the operation of the numeric button switch 138 is completed to mean that the input of numbers ended. When the channel is switched, a new channel number, a call sign (name), a logo, a banner comprising a mail icon are displayed for three seconds. This banner includes a simple structure comprising the aforementioned parts and a detailed structure which further contains a program (broadcast program) name, the start time of the programs, and current time. A display button 136 is operated when the kind of this banner to be displayed is switched over.

A television/video switching button switch 139 is operated when the input of the monitor device 4 is switched over to the input (VCR or the like) from a tuner or a video input terminal incorporated in a television set. A television/DSS switching button switch 140 is operated when a television mode or a DSS mode is selected. When the numeric button switch 138 is operated to switch over the channel, the channel before the switching over is memorized, and the jump button switch 141 is operated when the channel returns to the original channel before the switching over.

A language button 142 is operated when a predetermined language is selected in the case where programs are broadcast in two or more languages. The guide button switch 143 is operated when the general guide (FIG. 19) is displayed on the monitor device 4 directly without using a menu.

A cable button switch 145, a television button switch 146 and a DSS button switch 147 are a switch for switching over a function, that is, for switching over an apparatus category of the code of infrared rays signal emit from a remote commander 5.

The cable button switch 145 is operated when a signal transmitted via a cable is received with a cable box (not shown) and is displayed on the monitor device 4 with the result that the code of an apparatus category assigned to the cable box is emit as infrared rays signal. In the same manner, the television button switch 146 is operated when a signal received by the tuner incorporated in the monitor device 4 is displayed.

The DSS button switch 147 is operated when a signal received via a satellite is received at IRD 2 and is displayed in the monitor device 4. The LED's 148, 149 and 150 are respectively lit when the cable button switch 145, the television button switch 146 or the DSS button switch 147 are turned on. Consequently, when each kind of button is turned on, it is shown to which category of device the code is sent.

When the cable power source button switch 151, a television power source button switch 152, a DSS power source button switch 153 are operated, the power sources of the cable box, the monitor device 4 or the IRD 2 are turned on or off.

A muting button switch 154 is operated when the muting state of the monitor device 4 is set or relieved. A sleep button switch 155 is operated when a predetermined time comes or when a predetermined time has passed away and the sleep mode is set or relieved for automatically turning off the power source.

Figure 6:
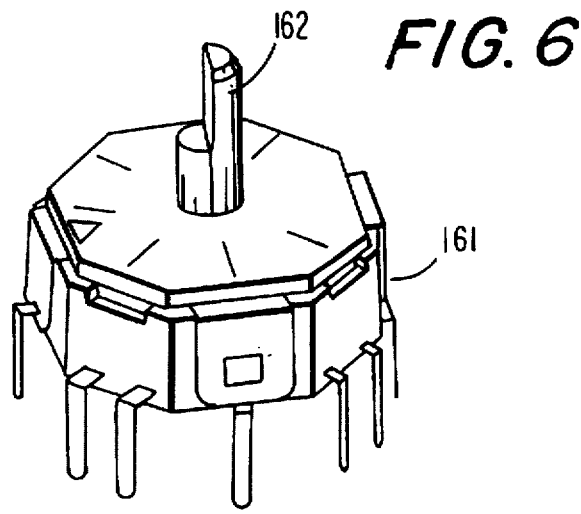
FIG. 6 is a perspective view showing a structure example of a small stick switch constituting a select button switch 131.

FIG. 6 shows a construction example of a small-size stick switch used as a select button switch 131. This small-size stick switch has a structure in which a lever 162 projects from a main body 161. Then when the select button switch 131 is operated in eight directions on a horizontal surface, the apparatus rotates corresponding to the operation direction. When the select button switch 131 is select operated (vertically operated), the lever 162 is pressed down to the vertical direction.

Incidentally, as this small stick switch, a model RKJXL1004 manufactured by Alps Electric Co., Ltd. can be used for example. The main body 161 of this small stick switch has a thickness of about 6.4 mm.

Figure 7:
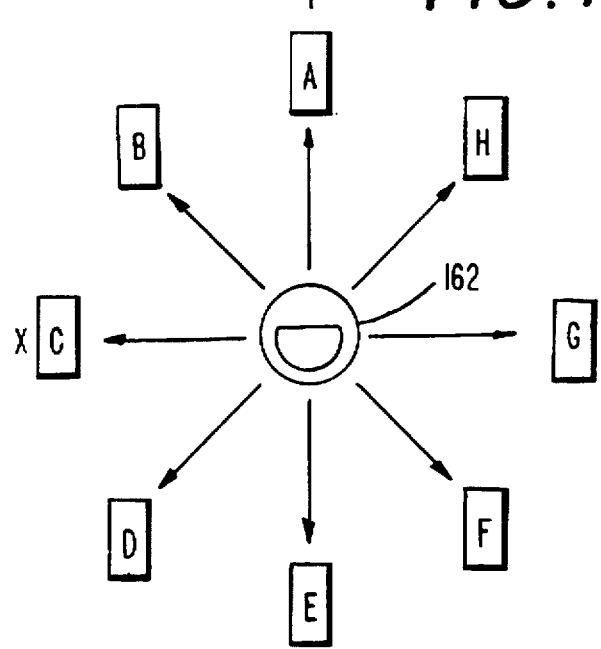
FIG. 7 is a view showing an operation direction on a horizontal surface of a lever 162.

FIG. 7 shows the eight operation directions on a horizontal surface of the lever 162. As shown in this figure, the lever 162 can be operated in eight directions on a horizontal surface which are shown as A through H.

Figure 8:
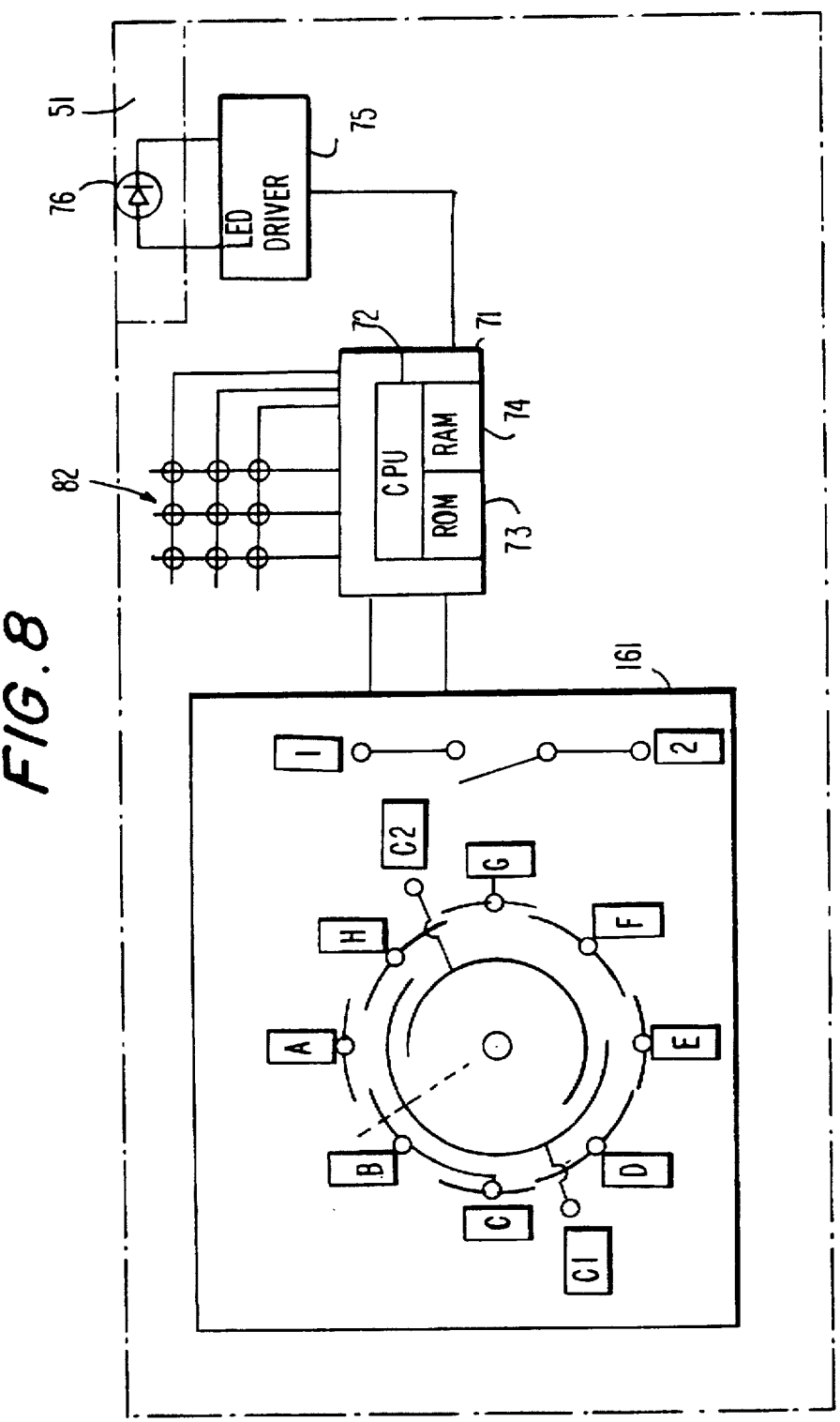
FIG. 8 is a block diagram showing a structure example of the inside of a remote commander 5.

FIG. 8 shows a structure example of the inside of a remote commander 5. As shown in FIG. 8, contact points A through H of the inside of the main body 161 of the small-size stick switch correspond to eight directions A through H shown in FIG. 7. When the lever 162 is operated in the directions A through D, one of the terminals A through D is conducted to the terminal C1. And when the lever 162 is operated in the directions E through H, one of the terminals E through H is conducted to the terminal C2. In addition, between H and A and between D and E, both terminals C1 and C2 are conducted. Further, when the lever 162 is operated in the vertical direction, the terminals 1 and 2 are conducted.

The conducting state of these terminals in the main body 161 is monitored by the CPU 72 which comprises a microprocessor 71. Consequently, the CPU 72 can detect the direction operation of the select button switch 131 and the select operation.

The CPU 72 constantly scans the button switch matrix 82 to detect the operation of the remote commander 5 and of the other button switch 50 shown in FIG. 5.

The CPU 72 executes each kind of processing in accordance with the program stored in the ROM 73 thereby the necessary data is appropriately stored in the RAM 74.

The CPU 72 drives the LED 76 via the LED driver 75 to output an infrared rays signal. Next, details of the Direct Broadcast Satellite System is introduced in "Technology Supporting US Information Super Highway" Nikkei Electronics Published by Nikkei BP Company, pages 180 through 189 (Published on Oct. 24, 1994) by L. W. Butterworth, J. P. Godwin, and D. Radbel.

Figure 9:
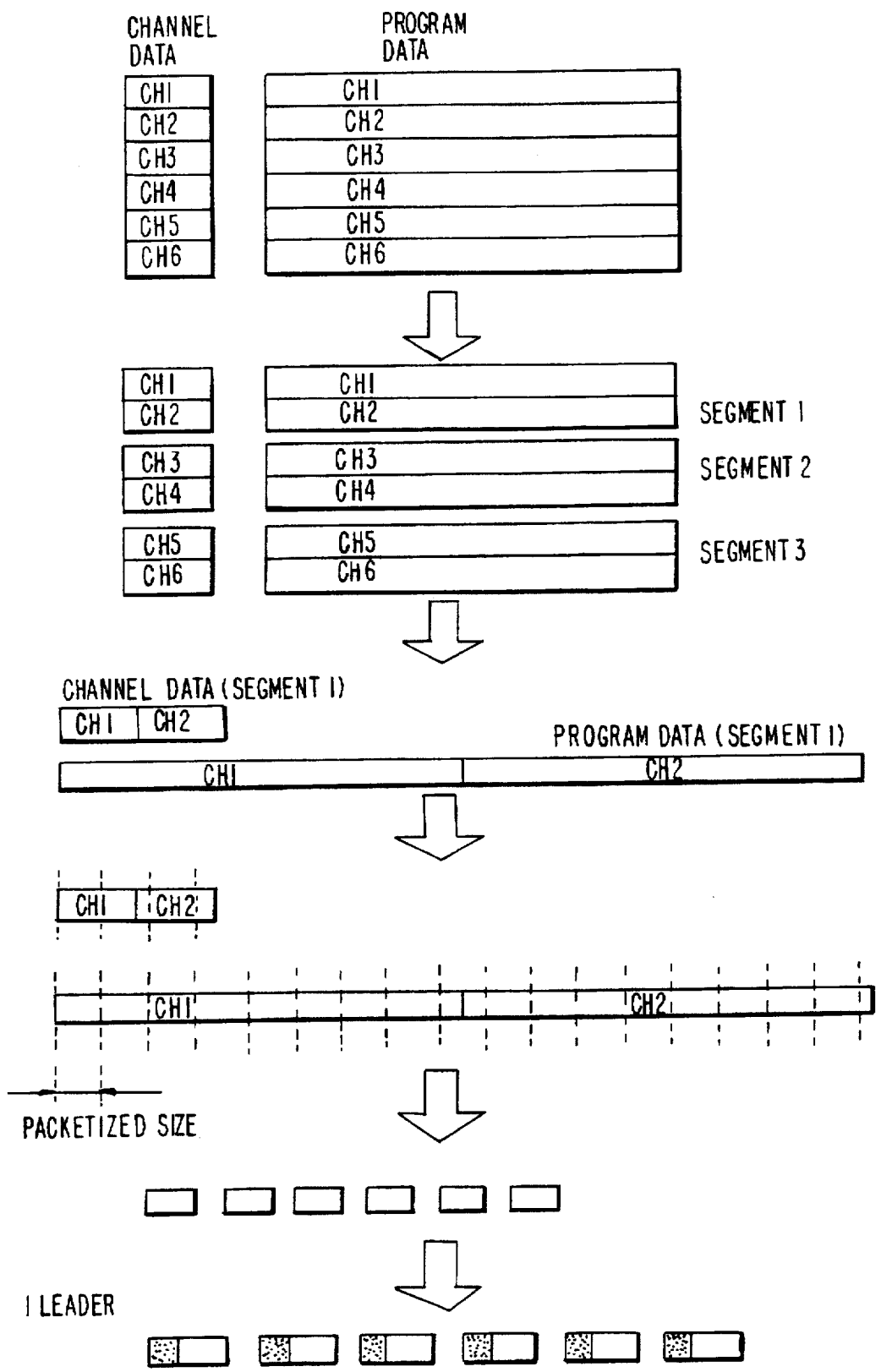
FIG. 9 is a view illustrating a segmentation of a channel data and a program data.

FIG. 9 shows a generation procedure of a transmission data performed by an encoder of the Direct Broadcast Satellite System. The EPG data includes a guide data, channel data, and program data. The guide data refers to data concerned with the total program guide. The channel data refers to data concerned with the channel. The program data refers to data concerned with the program. The details thereof will be described by referring to FIG. 12.

Out of these data items, the channel data and the program data is sectioned for each of the channels. A predetermined number of channel data is summarized as a segment. In the embodiment shown in FIG. 9, the channel data and the program data in channel 1 and channel 2 are referred to as data in respective segment 1. The channel data and the program data in channel 3 and channel 4 are referred to as data in respective segment 2. The channel data and the program data in channel 5 and channel 6 are referred to as data in respective segment 3.

Figure 10:
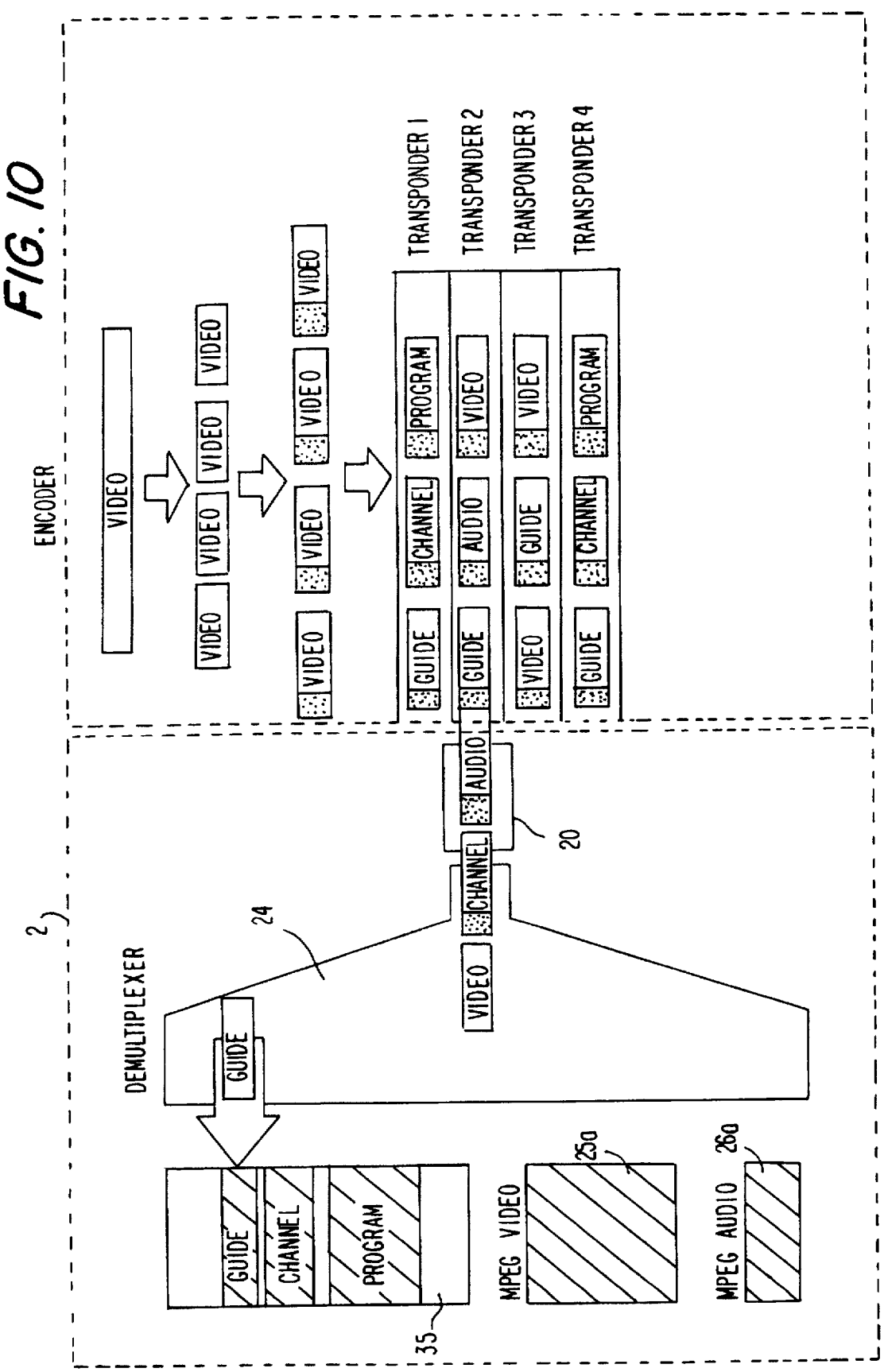
FIG. 10 is a view showing a treatment at an encoder on the sending side and a treatment of the IRD 2 for receiving the output of the encoder.

Then these channel data and the program data are divisioned in a predetermined size of a packet. Respective header is added to each packet. Data is transmitted to this packet unit. In the transmission side encoder, as shown in FIG. 10, not only such data items as channel data and program data but also such data items as guide data, video data and audio data are packetted and transmitted to a satellite mounted high output transponder in a BSS band having a frequency of 12.2 GHz to 12.7 GHz. In such a case, a packet in a plurality of channels (9 at maximum) is multiplexed and transmitted to a predetermined frequency signal assigned to each transponder. That is, each transponder transmits signals of a plurality of channels with one carrier wave. Consequently, for example, when the number of transponders is 23, data in 207 (=9×23) channels at maximum can be transmitted.

In IRD2, one frequency carrier wave corresponding to a predetermined one transponder is received and demodulated at a front end 20. With this, packet data in 9 channels at maximum can be obtained. The demultiplexer 24 temporarily memorizes each packet obtained from this demodulation output in a data buffer memory 35 and read it therefrom. With respect to the packet of the EPG data (guide data, channel data and program data) data portion excluding the header is memorized in the EPG area 35A. The video packet is supplied to the MPEG video decoder 25 and decoded. The audio packet is supplied to the MPEG audio decoder 26 and decoded.

The details of processing at the encoder shown in FIG. 10 is described in "Technology Supporting US Information Super Highway" in the aforementioned Nikkei Electronics, pages 180 through 189. In each transponder, scheduling is performed so that the transmission rate becomes the same. The transmission rate for each of the carrier wave assigned to each transponder is 40 Mbits/sec.

For example, as in sports programs, in the case of a strongly animated images, the MPEG video data occupies many packet. Consequently, when there are many such programs, the number of programs that can be transmitted with one transponder becomes few.

In the meantime, like a screen of an announcer in news programs, the MPEG video data with weakly animated image can be transmitted with a few packet. Consequently, when the number of such programs are many, the number of programs that can be transmitted with one transponder becomes large.

Figure 11:
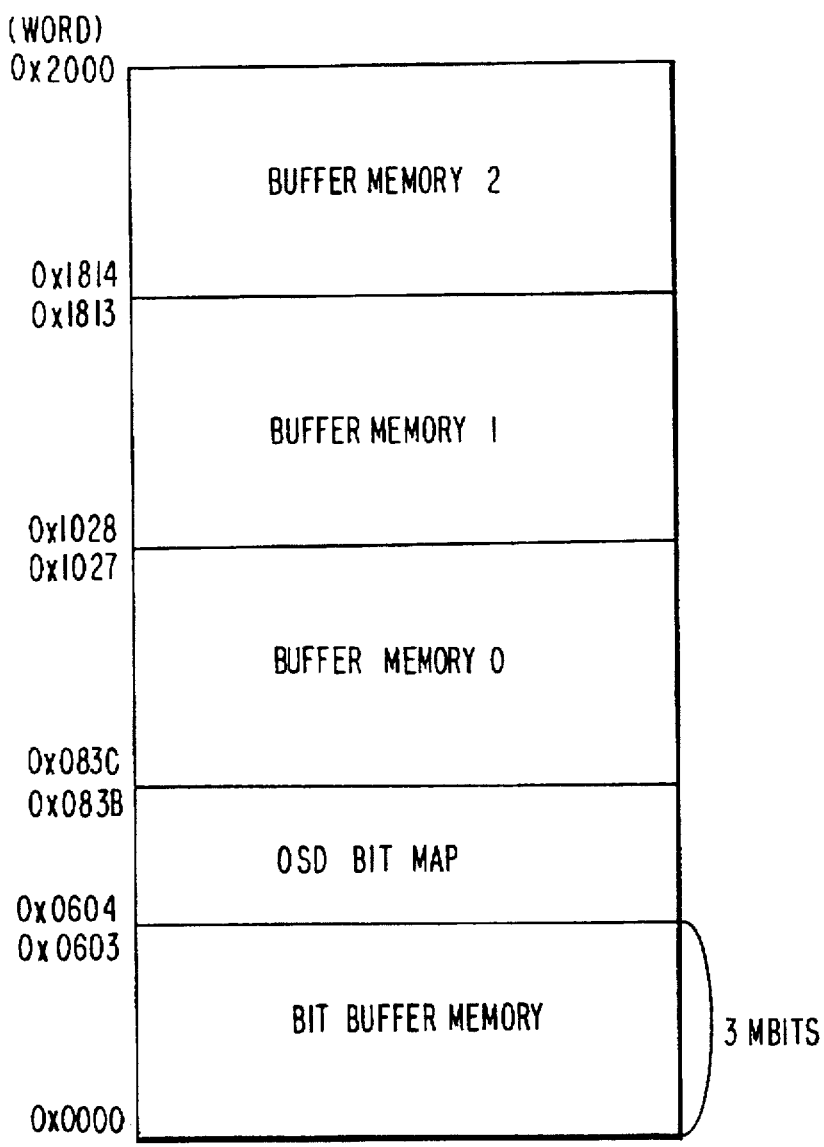

FIG. 11 shows the state of the usage inside of the DRAM 25a. For example, when the screen of the monitor device 4 is constituted of 720×480 pixels. The luminance of each pixel is represented by 8 bits. The color difference is represented by 8 bits at a ratio of one pixel to two pixels. The number of required bits to constitute a screen becomes 4147200 (720×480×1.5×8) bits. Assuming that one word comprises 64 bits, the number of pixels corresponds to 64800 words. When it is represented by a hexadecimal number, it becomes 0×FD20 words.

As a number that can be set in a register in the MPEG video decoder 25 which controls the DRAM25a, this value is too large. When this value is shifted to the LSB side by 5 bits, 0×FD20 becomes 0×7EQ. Further, since the value set in this register needs to be a multiple of 4, setting 0×7EQ to a number which is most similar to a multiple of 4 which is larger than the value, the value becomes 0×7EC.

Consequently, in this embodiment, a buffer memory 0 through buffer memory 2 are provided for the storage of image data of I picture, P picture and B picture. The respective capacity is set to 64896 words. Further, as an OSD data memory area, 18176 words area is secured, and as a bit buffer memory area for temporarily storing input data, 49280 words area is secured.

Figure 12:
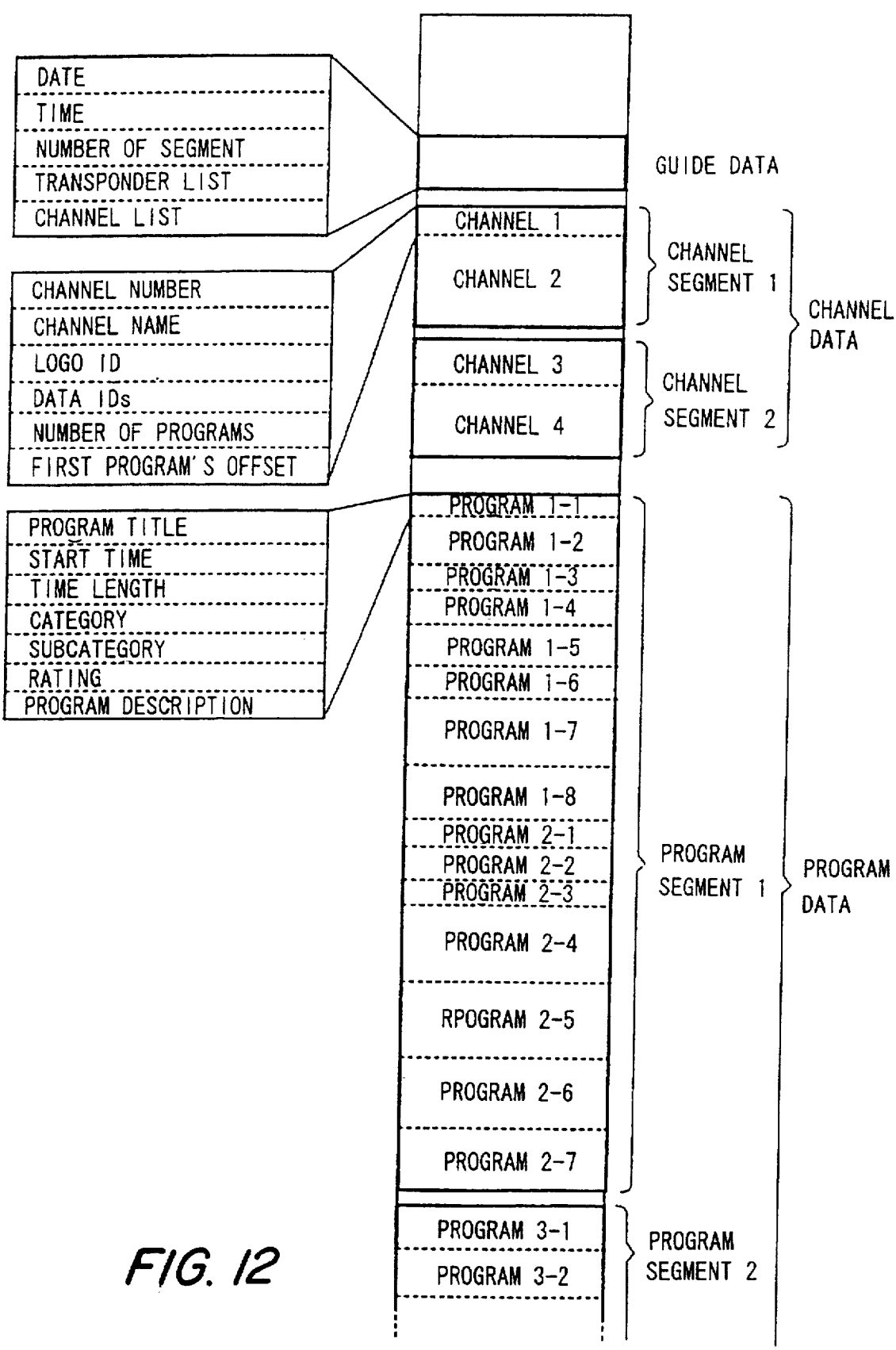
FIG. 12 is a view illustrating EPG data memorized in the EPG area 35A.

FIG. 12 schematically shows a memory state of the EPG data (program guide data) stored in the EPG area 35A of the data buffer memory 35. The CPU 29, as described before referring to FIGS. 9 and 10, memorizes in the EPG area 35A the EPG data encoded in the transmission side encoder and transmitted by a packet unit as shown in FIG. 12.

As shown in FIG. 12, the program guide data (data of program guide) (EPG data) is subsequently memorized in the order of the guide data, the channel data and the program data.

This guide data contains date representing the current date, time representing the current time, number of segment representing the total number of segment, each segment number, a transponder list where a transponder number corresponding to each segment number and a channel list which is a list of numbers at the head of channels occupied by the segment.

Subsequent to such guide data, channel data is arranged in the order of segment 1, segment 2, segment 3, and so on. In each segment, a predetermined number of channel data items are arranged. In this embodiment, data in channels 1 and 2 are arranged in segment 1, data in channels 3 and 4 are arranged in segment 2 respectively.

Each channel data contains a channel number representing the number of the channel, a channel name representing a call sign (name) of a broadcast station, a logo ID for identifying a logo of a broadcast station, data IDs for identifying the MPEG video data and the MPEG audio data, the number of programs representing the number of programs the channel (for example, channel 1) has, and a first program's offset representing an offset value from a place (an address) where the first program data of a predetermined channel is memorized (for, example, in the case of channel 2, the start of a program segment (the start of program 1-1 in the case of FIG. 12) until an address where the initial program data program 2-1 is memorized).

Further, the program data comprises the program title representing the title of the program, a start time representing a start time of broadcast, a time length representing a time length of the program, a category representing a genre (category) of the program, a subcategory representing a minute classification of the genre (category), a rating representing an age limit of the program, and a program description in which detailed content of the program (for example, conditions for decoding the data of the program in which pay per view is encoded).

Such program data is arranged in summary for each segment. In such an embodiment, the program data in segment 1 comprises data in eight channels 1 such as program 1-1 through program 1-8 and data in seven channels 2 such as program 2-1 through program 2-7.

Figure 13:
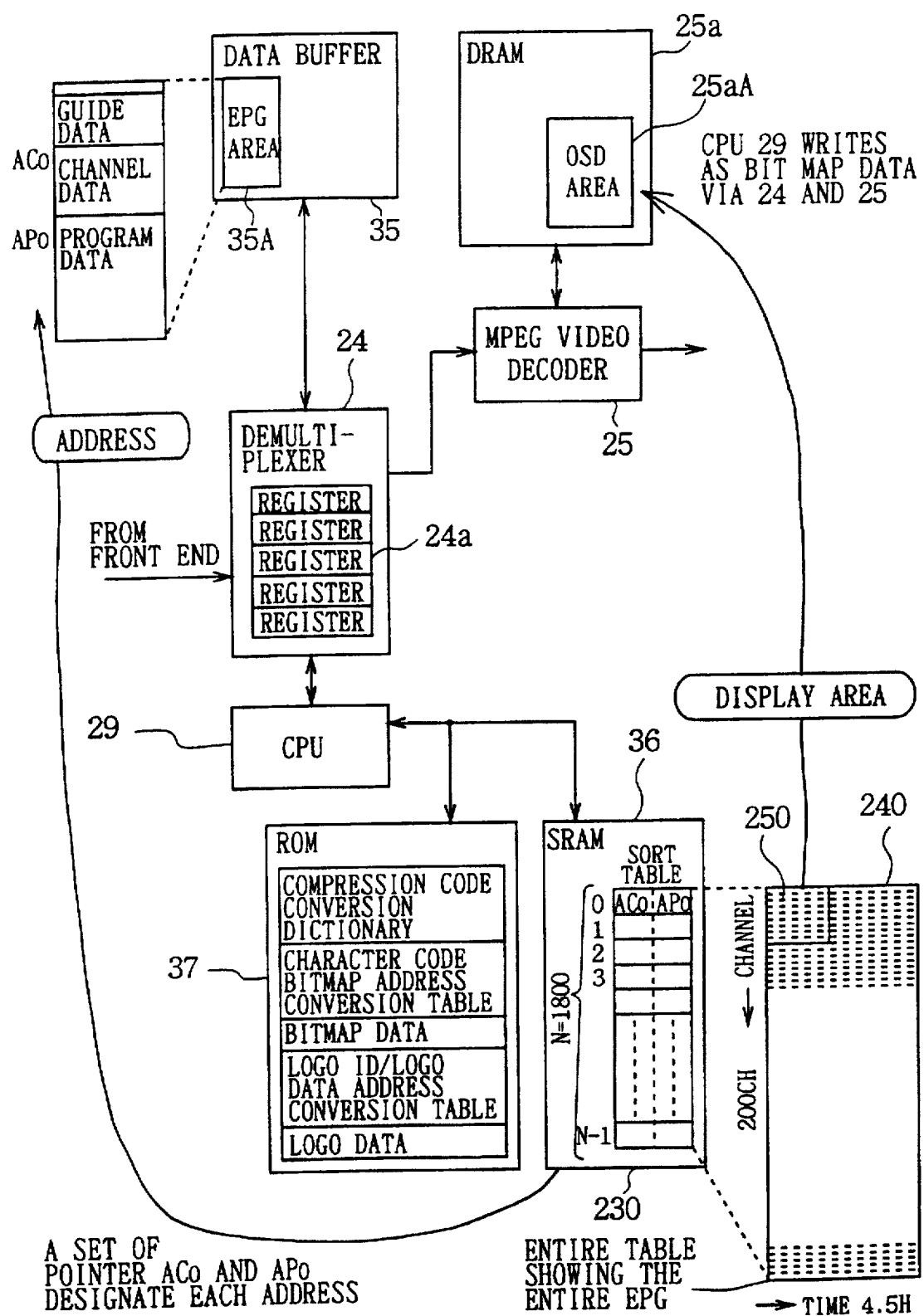
FIG. 13 is a view illustrating the preparation of a sort table.

FIG. 13 schematically shows data treatment until a screen for the general guide is displayed on the monitor device 4.

The CPU 29 preliminarily sets in a register 24a incorporated in the demultiplexer 24 a transmission address of data input from the front end 20. Then after the data supplied from the front end 20 is temporarily memorized in the data buffer memory 35, the data is read from the demultiplexer 24, and is transmitted to the transmission address set in the register 24a.

As described above, each packet is added with the header. The demultiplexer 24 refers to this header and supplies the MPEG video data to the MPEG video decoder 25. Then the demultiplexer 24 transmits the MPEG audio data to the MPEG audio decoder 26. Then when the data IDs contained in the header is the guide data, the channel data, or the program data, these EPG data is memorized in a predetermined address of the EPG area 35A set in the register 24a. In this way, the EPG data is memorized in the EPG area 35A as shown in FIG. 12.

Incidentally, the header is discarded as it is not required upon the completion of this transmission.

In this manner, when the EPG data in the capacity of the EPG area 35A having, for example, 120 Kbytes is memorized, the demultiplexer 24 outputs the full up-status signal to the CPU 29. The CPU 29 suspends the incorporation of the EPG data upon receipt of the control signal. After that, when the EPG is displayed, decoding operation such as the extension, sort, the decoding process of the EPG data compressed is executed.

In this manner, when the EPG data is incorporated in the EPG area 35A from the present time of, for example, 200 channels until 4.5 hours after, this EPG data (guide data, channel data and program data) can be received from any transponder. That is, the same EPG data is transmitted in any transponder.

Next, the CPU 29 prepares a sort table 230 for retrieving data in a predetermined channel from the EPG data memorized in the EPG area 35A, and the sort table is memorized in the SRAM36 (the preparation treatment of this sort table will be described in detail by referring to FIG. 14). This sort table 230 corresponds to all the EPG table 240 for retrieving each program from the present time of all the channels (for example, 200 channels) until 4.5 hours after.

The CPU 29 reads from the EPG area 35A the data of program in a predetermined scope of time (until 1.5 hours after the present time, for example, in FIG. 19 to be described later) of channels in the predetermined display area 250 (seven channels in, for example, FIG. 19 to be described later) from the all EPG table 240 and the read data is written in the OSD area 25aA of the DRAM 25a as bit map data. Then the MPEG video decoder 25 reads the bit map data in the OSD area 25aA and output the data to the monitor device 4 so that guide EPG such as general guide (FIG. 19) or the like can be displayed on the monitor device 4.

When characters or the like as OSD data is displayed, character data memorized in the EPG area 35A is compressed, the dictionary is used to execute the original processing. Consequently, the ROM 37 memorizes compression code conversion dictionary. This compression code conversion dictionary includes a syllable dictionary and a word dictionary. There are one kind of syllable dictionary and three kinds of word dictionaries prepared.

Words are represented by two byte data, and first one byte refers to a number representing the kind of three kinds of word dictionaries and are designated by 0, 1 or 2. Out of two byte data, preliminarily prepared words are arranged in the order of 0 through 255 with the remaining one byte. One word is represented by the number. When the encoder on the transmission side transmits a predetermined words, the word is transmitted by transmitting this two byte code. In the ROM 37, the same dictionary as this conversion dictionary prepared on the encoder side is prepared, this conversion dictionary is used to restore the two byte code to the original word.

Further, when characters other than the prepared word is transmitted, a predetermined one of the preliminarily prepared 252 kinds of syllables is combined to transmit one word. This syllable is represented by one byte code.

The ROM 37 memorizes a corresponding table (address conversion table) with the storage position of the bit map data of character codes and fonts. By referring to this conversion table, the bit map data which corresponds to the predetermined character code can be read and written in the OSD area 25aA. Of course, the ROM 37 memorizes this bit map data in a predetermined address.

Further, the ROM 37 memorizes a logo data for displaying a logo. At the same time, the ROM 37 memorizes an address conversion table for calling a logo ID and a logo data (bit map data) corresponding to the ID. When the logo ID is made clear, by reading the logo data which is memorized in an address corresponding to the ID and writing the data into the OSD area 25aA, the logo in each broadcasting station can be displayed on the monitor device 4.

Incidentally, the sort table memorized in the SRAM 36 is prepared in the order of the channel number. When the sort table is used to extract a specific channel or a program or replace the order thereof by using a category or the like, this sort table is rewritten. However, as described later, this sort table is a table where position information (pointer) of the channel data and the program data is stored. The pointer of the program data and the channel data constitutes one set. When this program data and the channel data are rewritten, the data is changed as a set unit.

Figure 14:
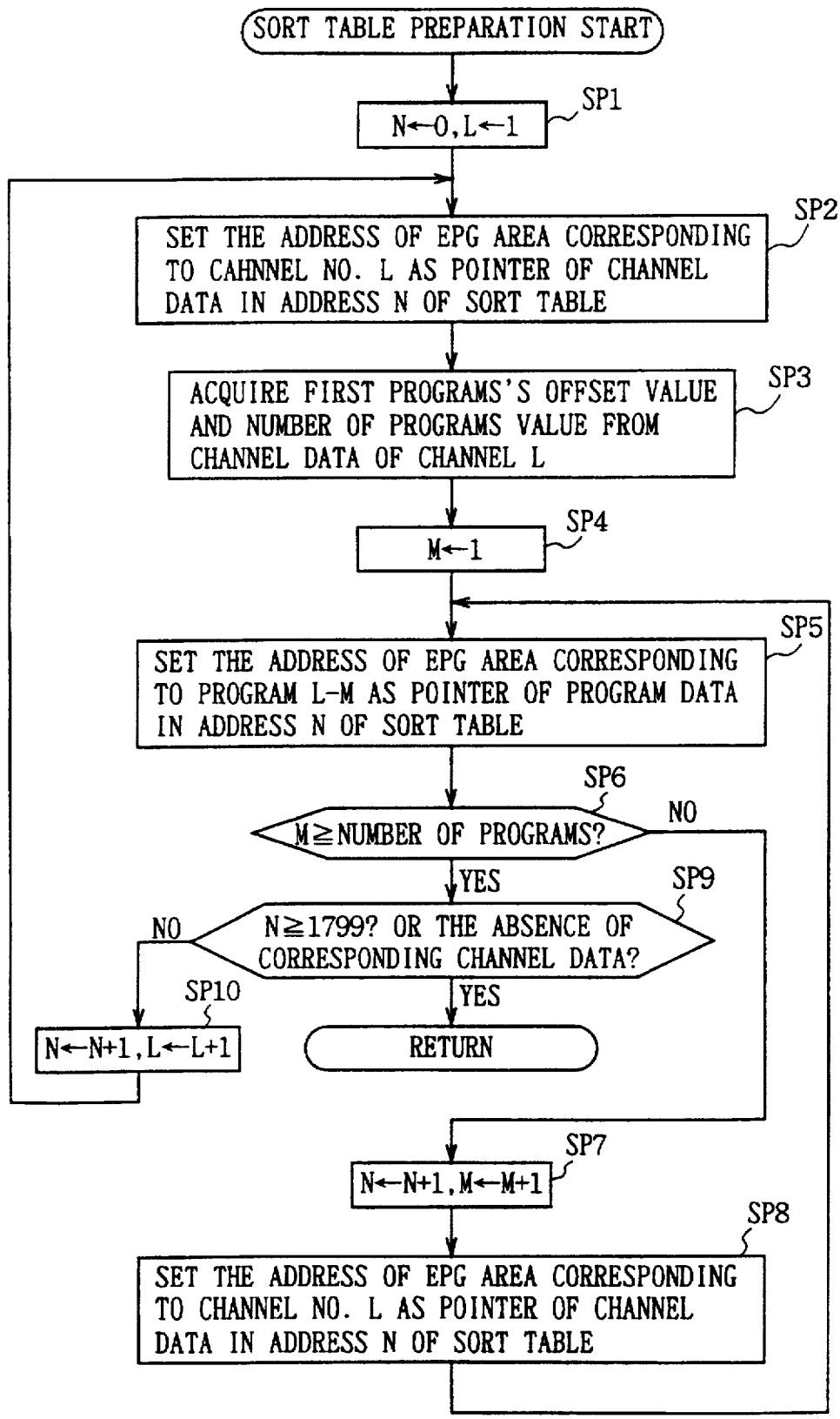
FIG. 14 is a flowchart showing a preparation treatment of a sort table.

FIG. 14 shows a processing example for preparing a sort table to be written into the SRAM 36. For example, assume that the EPG of 4.5 hours in 200 channels, the minimum time of each program is set to 0.5 hours (30 minutes) so that 9 programs at maximum can be transmitted in one channel. Consequently, 1800 (=200×9) programs at maximum can be transmitted with 200 channels. Then, in the processing example shown in FIG. 14, the set number of the sort table is set to 1800.

In the beginning, at step SP1, the variable N is initialized to 0. Then, the variable L is initialized to 1. This variable N represents a set number (address) of the sort table. For example, the set number assumes 0 through 1799. Further, the variable L represents the channel number and assumes any of the values ranging from 1 to 200.

Next, the process proceeds to step SP2 where the address PCL (PC1 in this case) in the EPG area 35A corresponding to the channel number L (channel number 1 in this case) as pointer of channel data of the address N (N=0 in this case) of the sort table N of the SRAM 36. As a consequence, an address PC1 is set in the EPG area 35A of the channel 1 as the pointer of channel data of the address 0 in this case.

Next, the process proceeds to step SP3 where a first program's offset and the number of programs are obtained from the channel data of the channel number L. This first program's offset is used for retrieving the program L–M at step SP5.

The process proceeds to step SP4 to initialize the variable M to 1. This variable M represents the number of programs in the same channel which is set to any value from 1 through 9. Further, at step SP5, an address of the EPG area 35A corresponding to the program L–M (program 1-1 in this case) as a pointer of program data in an address N (N=0 in this case) in the sort table. Consequently, in such a case, an address PP1-1 in the EPG area 35A of the program 1-1 is set as the pointer of program data of address 0.

Next, the process proceeds to step SP6 where it is judged whether or not the variable M is the number of programs or more. When the value M is smaller than the number of the programs in the same channel, the process proceeds to step SP7, the variables N and M are incremented by 1 thereby providing N=1 and M=2. Further, at step SP8, an address PC1 in the EPG area 35A corresponding to the channel number L (channel number 1 in this case) is set as the pointer of channel data of the address N (address 1 in this case) in the sort table.

Then, the process returns to step SP5 and the processing after that is executed in the same manner.

Figure 15:
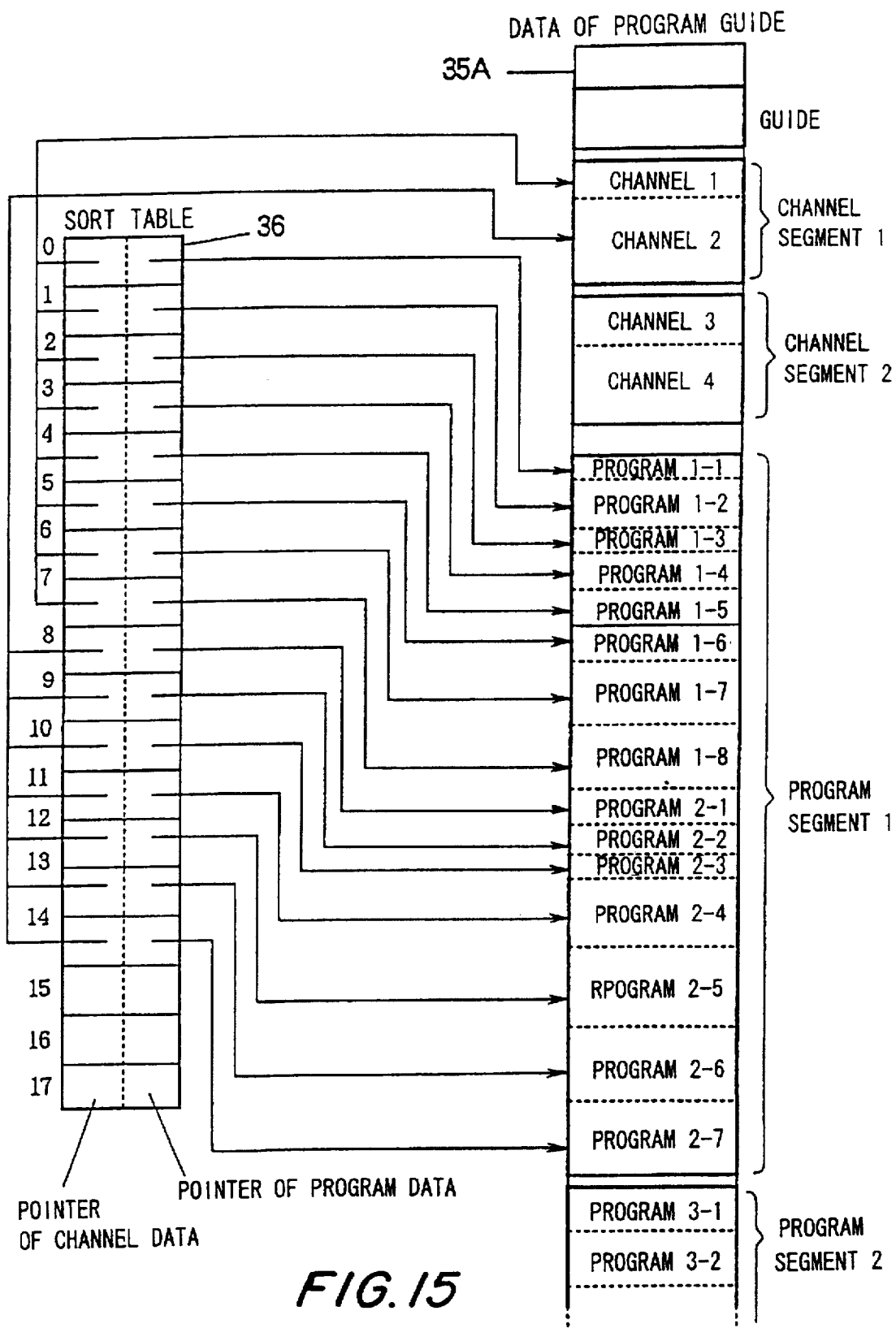
FIG. 15 is a view illustrating a pointer memorized in the sort table.

By repeating the process at step SP5 through S8, PC1 is memorized in addresses 0 through 7 of the sort table as pointer of channel data as shown in FIG. 15. Further, addresses PP1-1 through PP1-8 in the EPG area 35A in the program 1-1 through program 1-8 is respectively memorized as the pointer of program data of the addresses 0 through 7 in the sort table.

When the aforementioned processing is completed, it is judged at step SP6 that the variable M is equal to the number of programs. At this time, the process proceeds to step SP9. It is judged at step SP9 whether or not the variable N is more than 1799, or the corresponding channel data does not exit. When these conditions are not satisfied, the process proceeds to step SP10 so that the variable N and the variable L are incremented by 1. In this case, N is set to N=8 while L is set to L=2.

After that, the process returns to step SP2 to execute the same processing repeatedly. Consequently, as shown in FIG. 15, PC2 is written in the addresses 8 through 14 of the sort table as pointer of channel data while PP2-1 through PP2-7 are written as pointer of program data is written respectively. The process after that proceeds in the same manner.

Figure 16:
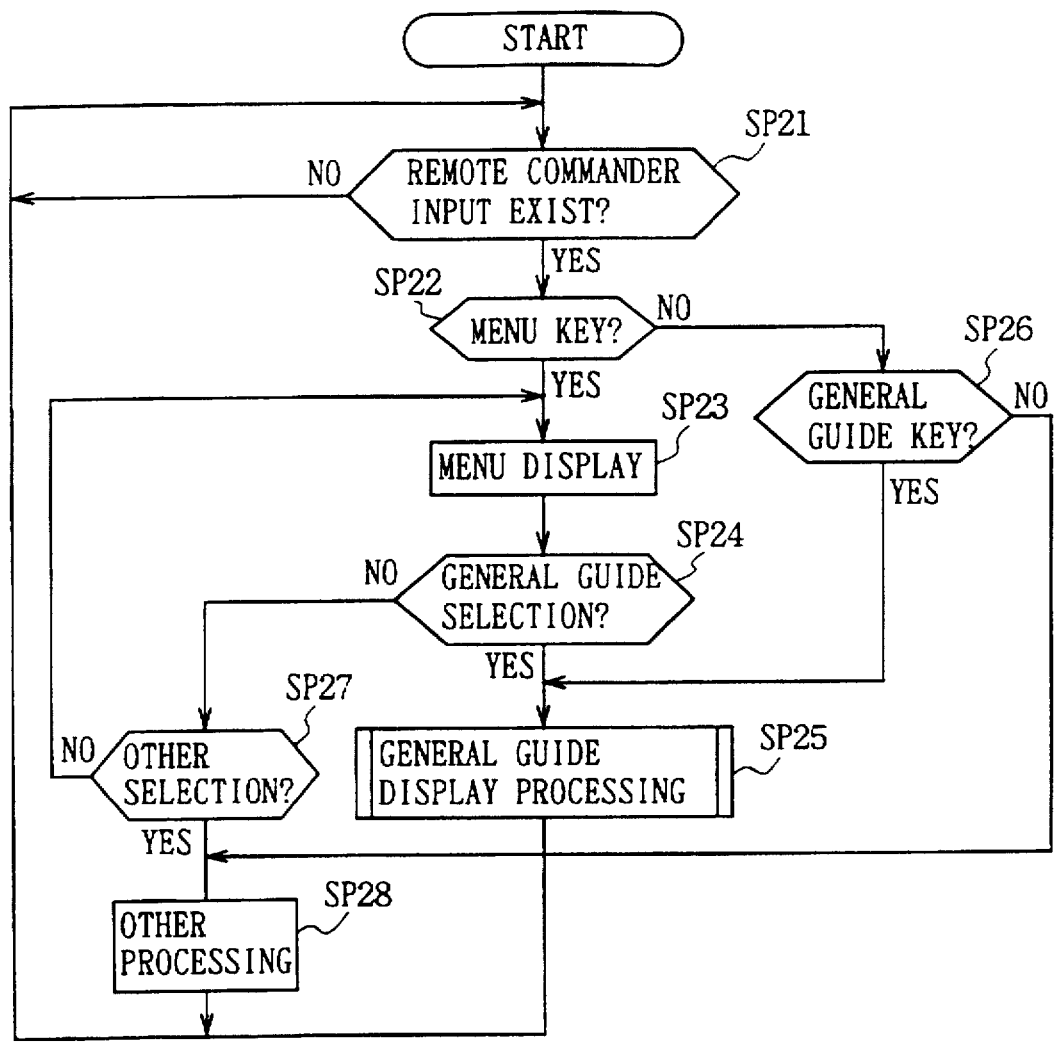
FIG. 16 is a flowchart illustrating an operation of an embodiment of the present invention.

Next, by referring to the flowchart shown in FIG. 16, a processing example is explained for allowing the monitor device 4 to display the general guide. In the beginning, at step SP21, it is judged whether or not a predetermined button switch of a remote commander 5 is operated and it is waited until the switch is operated.

In other words, when the CPU 72 of the remote commander 5 detects that a predetermined button is operated via a button switch matrix 82 or the main body 161 of the select button switch 131, the LED 76 is operated via the LED driver 75 to output an infrared rays signal corresponding to the operated button switch.

The CPU 29 of the IRD 2 receives the input of this infrared rays signal via the IR receiving part 39 to judge which of the button switches in the remote commander 5 is operated from the input signal.

Then, in the case where it is judged at step SP21 that the predetermined button is operated, the process proceeds to step SP22 where it is judged whether or not the operated switch is the menu button switch 134. When it is judged that the menu button switch 134 is operated, the process proceeds to step SP23 and the CPU 29 executes the menu display processing.

In other words, the CPU 29 writes bit map data in the main menu as shown, for example in FIG. 17 in the OSD area 25aA of the DRAM25a in correspondence to the EPG data (program guide data) which is memorized in the EPG area 35A. Then this bit map data is read from the DRAM25aA and is input into the NTSC encoder 27 from the MPEG video decoder 25 to be converted into a NTSC method data. This NTSC method data is supplied to the monitor device 4 and displayed there as a S video signal or a composite signal via an AV line 11.

Figure 18:
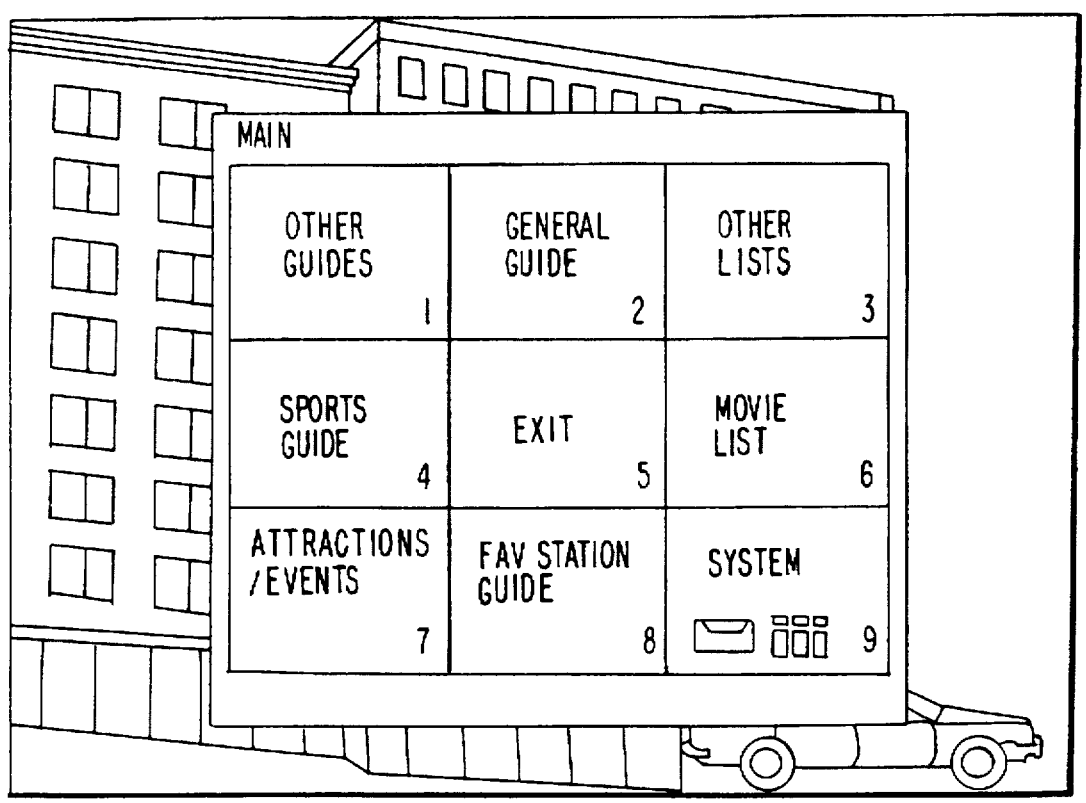
FIG. 18 is a view showing an overlap display on a receiving channel image using a menu as a window.

This results in the overlapping of the main menu shown in FIG. 17 onto the channel image received and displayed at that time as shown in FIG. 18. Then the menu is displayed on the CRT 4A of the monitor device 4 as a window. This is realized by reading and outputting a bit map data from the OSD area aA in the DRAM25a for each period when data in the predetermined window display area is read in the process of decode processing of video data which is compressed with the MPEG method.

In the main menu screen shown in FIG. 18, the window is partitioned into nine areas so that button icons (soft buttons) are displayed for selecting a predetermined mode for each area. User can move the cursor (in this embodiment, the predetermined button icon is displayed in luminance (brightness), colors, or blinking different from other button icons to be used as the cursor, and in the case shown in FIG. 18, the cursor is positioned on the button icon of the general guide) in either direction by directionally operating the select button switch 131 to any of the eight directions on the horizontal surface.

For example, when the select button switch 131 is operated in the left direction from the button icon of the general guide, the cursor is moved onto the button icon of other guides. Further, when the select button switch is operated diagonally toward the left downward direction, the cursor is moved from the button icon of the general guide onto the button icon of the sports guide.

For example, when the select button switch 131 can only be operated in four directions of up and down and left and right, for moving the cursor from the button icon of the general guide to the button icon of the sports guide, the cursor is required to be temporarily moved to the left and then moved to the lower side, or to be temporarily moved to the lower side, and then moved to the left side. In other words, in such a case, two times operation are needed. In the meantime, when the whole apparatus is constituted so that the select button switch 131 can be operated in diagonal directions as well as four directions of up and down and left and right, the cursor can be moved from the button icon of the general guide onto the button icon of the sports guide in one time.

Users select predetermined mode by moving the cursor on the predetermined button icon and then determine the selection by performing the select operation (vertical operation) for vertically pressing the select button switch 131.

At step SP24, the button icon of the general guide is selected to judge whether the selection is determined or not. In the case where the button icon of the general guide is selected and secured, the process proceeds to step SP25 to execute the general guide display processing. Details of the general guide display treatment will be described later in detail by referring to FIG. 21.

In the case where it is judged at step SP24 that the button icon of the general guide is not selected, the process proceeds to step SP27 to judge whether or not the other button icon is selected. When the button icon is not selected, the process returns to step SP23 to continue the menu display.

Then in the case where it is judged at step SP27 that the button icon other than the general guide is selected and determined, the process proceeds to step SP28 to execute the processing corresponding to the selected and determined button icon.

On the other hand, in the case where it is judged at step SP22 that the input from the remote commander 5 is not the operation of the menu button switch 134, the process proceeds to step SP26 to judge whether or not the guide button switch 143 is operated. In the case where it is judged that the guide button switch 143 is operated, the process proceeds to step SP25 to execute the general guide display processing.

In the meantime, in the case where it is judged at step SP26 that the button switch other than the general guide button switch 143 is operated, the process proceeds to step SP28 to execute the processing corresponding to the button switch that has been operated.

As described above, the general guide can be displayed through a menu, and also can be displayed directly by operating the guide button switch.

Figure 20:
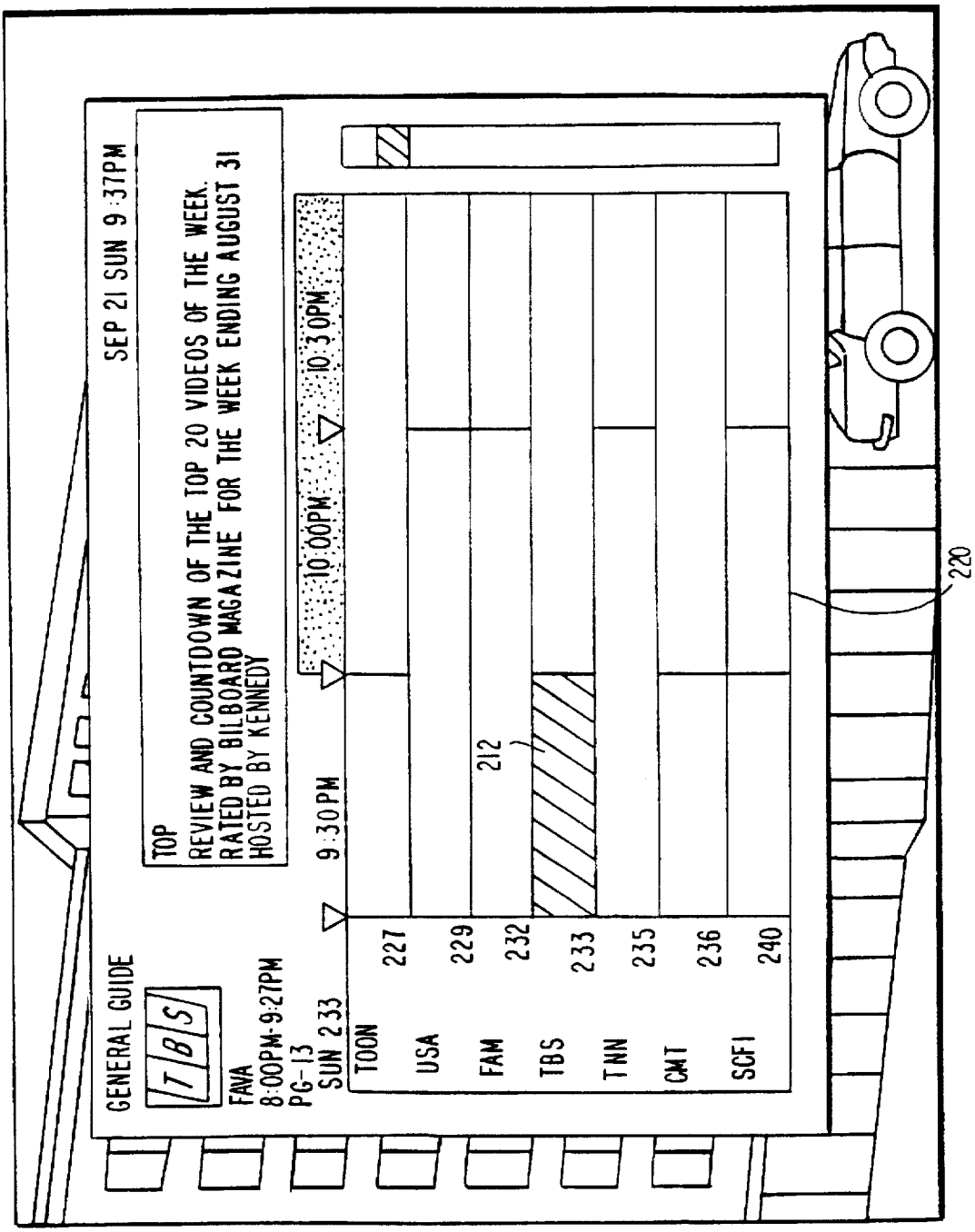
FIG. 20 is a view showing an overlap display on a receiving channel image using a general guide as a window.

The general guide display processing at step SP25 shown in FIG. 16 is executed so that the bit map of the general guide shown in FIG. 19 is written into the OSD area 25aA of the DRAM25a. Then, the bit map is read from the MPEG video decoder 25. The bit map is overlapped with the image in the broadcast channel selected at that time with the demultiplexer 24, and is displayed as a window as shown in FIG. 20.

In the general guide shown in this embodiment, the vertical axis is used as a channel axis, and the call sign (name of the broadcast station) of each broadcast station and the channel number are displayed. The horizontal axis is used as a time axis, and the broadcast time is displayed. At a predetermined position regulated by two axes, the program name is displayed in matrix. In this embodiment, program names for one and a half hours from the current time in seven channels are displayed for each channel. When the select button switch 131 of the remote commander 5 is directed and operated, the cursor 212 displayed in different luminance (brightness) and colors is moved onto the button icon corresponding to the direction operation.

Details will be given hereinbelow. In the general guide shown in FIG. 20, an area where the program names are displayed in matrix (in grids) will be referred to as a program name display area 220. This program name display area 220 corresponds to the display area 250 shown in FIG. 13. Then, within the scope of this program name display area 220, in accordance with the direction operation of the select button 131 in the upward (over side toward the operator), downward (front side of the operator), leftward and rightward directions, the cursor 212 moves respectively in the upward, downward, leftward and rightward directions.

Here, when the select button switch 131 is further directed and operated in the state in which the cursor 212 is moved to the up and down and right and left ends of the program name display area 220, the display content of the program name display area 220 is scrolled. For example, when the cursor 212 is positioned in the lowest line of the program name display area 220, and the select button switch 131 is directed and operated to the lower direction, the display content of the program name display area 220 is scrolled up by one line. Since the cursor 212 is stopped at the lowest line, consequently, in the whole EPG table 240 designating the EPG as a whole shown in FIG. 13, the cursor 212 is moved down by one line. With respect to the upward, downward directions and the rightward direction, the display content is scrolled until the end of the while EPG table 240 in the same manner.

Further, the select button switch 131 can be directed and operated in eight directions of left up, right up, left down and right down directions as well as four directions of up and down, left and right. The aforementioned movement of the cursor 212 can be operated in eight directions in accordance with the eight direction operation of the select button switch.

A series of operations such as eight direction operation of the select button switch 131 for moving the cursor 212, and a vertical operation (select operation) of the select button switch 131 for securing the selection of programs where the cursor 212 which is subsequently operated is positioned can be operated only with a thumb without holding the remote commander 5 with different hands thereby improving the operability.

Here, when a remote commander provided with a four direction cursor key and select button is used to realize the operation of the similar cursor movement, a plurality of operations are accompanied until the program is selected.

For example, as shown in FIG. 20, in order to move the cursor 212 displayed on the fourth line and the most left row of the program name display area 220 (rectangular area showing the program name of 9:30 through 10:00 in TBS 233) onto the lowest line and the most right row (rectangular area showing the program name of 10:30 through 11:00 in SCFI), the select button must be pressed after a downward cursor key is pressed three times and a rightward cursor key is pressed two times. Six times press operation in total is required. Further, every time the button to be pressed down is different, the remote commander must be held with different hand.

Then, in place of the aforementioned four direction cursor key, it is considered that the eight direction cursor key is provided. However, in such a case, it is required to secure a wide occupied area in the operation surface of the remote commander, which impedes the miniaturization of the remote commander itself. Further, since more press buttons are arranged, it is unavoidable that the operability of the press buttons is deteriorated.

In this embodiment, the select button serves as a cursor key which moves the cursor 212 in eight directions when the select button switch 131 is directed and operated in voluntary eight directions with a thumb with the result that the select button serves as a select button for securing the selection of a program with a vertical operation of pressing down the select button switch 131 with the thumb as it is. Consequently, a series of operations from the movement of the cursor 212 to the program selection can be operated without holding the remote commander with different hands, only by using the thumb at all times.

On the aforementioned general guide, the name of the EPG (general guide), the logo of the currently selected station (broadcast station), the content of the program, and the current date can be displayed.

Figure 21:
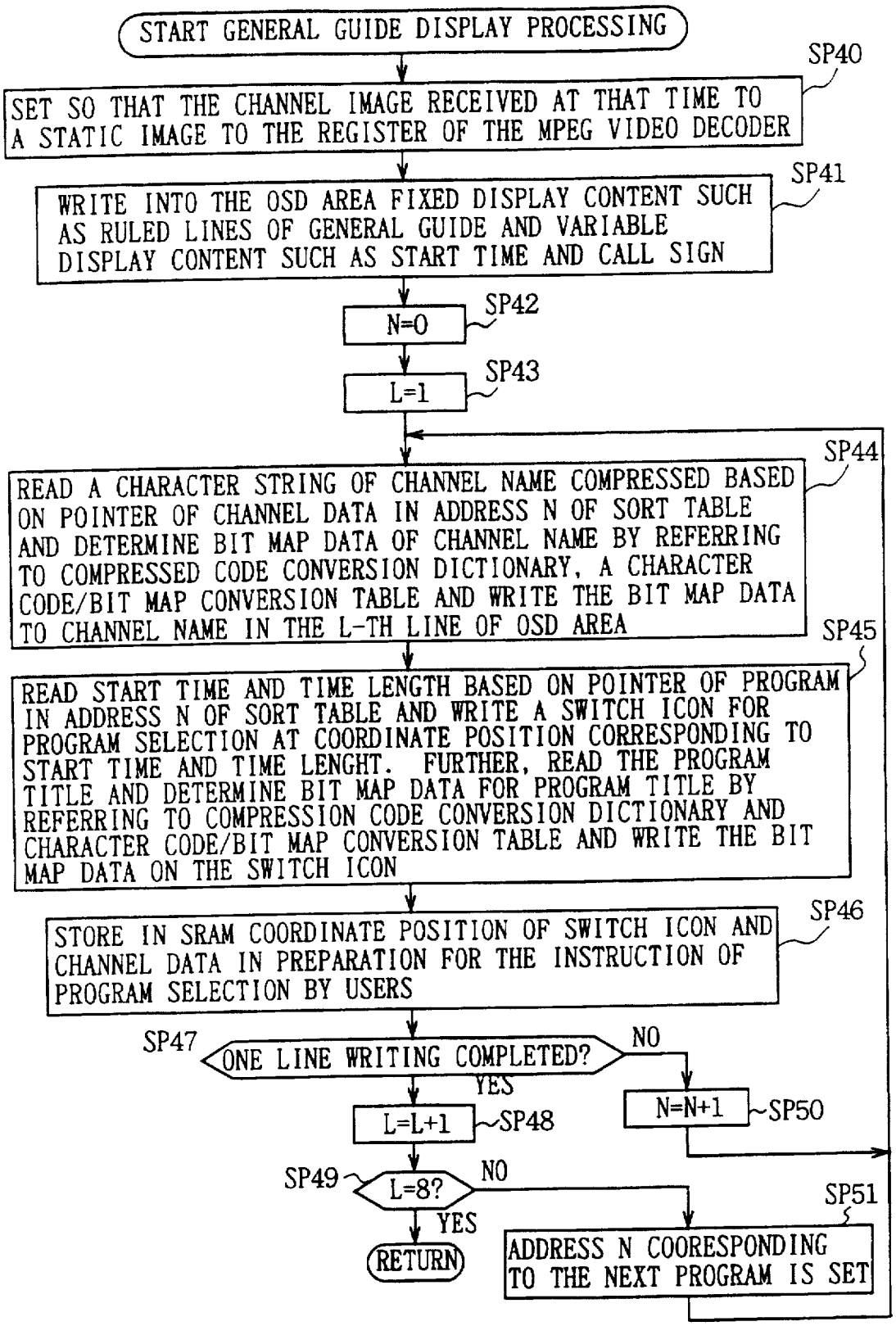
FIG. 21 is a flowchart showing the details of the general guide display treatment at step SP25.

FIG. 21 shows the details of the general guide display processing at step SP25. In the beginning, at step SP40, a setting for converting the channel image into a static image which is received (decoded) in the register of the MPEG video decoder 25 is performed by the CPU 29. The setting of the static image can be executed by consecutively reading one memory out of the buffer memory 0 through buffer memory 2 shown in FIG. 11 so as not to renew the buffer memory.

Next, at step SP41, a fixed display content such as ruled lines of the general guide, a variable display contents such as start time and call sign or the like are written into the OSD area 25aA of DRAM25a. Next, at the step SP42, the variable N which corresponds to the address of the sort table is initialized to 0. Then, at step SP43, 7 call signs (channels) of general guide shown in FIG. 19 and the variable L, representing line numbers of the program names which corresponds to the signs, is initialized to 1.

Next, at step SP44, character string of the compressed channel name is read on the basis of the pointer of channel data in the address N of the sort table of the SRAM 36 to be restored to the original character string by referring to the compressed code conversion dictionary, and a character code/bit map conversion table stored in ROM 37.

Further, the bit map data in the character string (channel name) is determined and is written into the item of the channel name in the L line (the first line in this case) in the OSD area 25aA. For example, in the embodiment shown in FIG. 19, the channel name of "TOON" is written. In the same manner, the channel name is also written into the channel number. In other words, a number "227" which corresponds to the "TOON" is written.

Then the process proceeds to step SP45 where the start time and the time length are read on the basis of the pointer of program data in the address 0 of the sort table. In the coordinate position which corresponds to the start time and the time length, button icons (data thereof is also stored in the ROM 37) for the program selection are also written. Further, the program title is read and the character string of the program title is restored by referring to the compression code conversion dictionary, character code/bit map conversion table. Further, the bit map data is determined and write it on button icons. In this manner, the name of programs which are broadcast from 9:30 PM of "TOON" to 11:00 PM are written.

Then the process proceeds to step SP46, and memorizes the button icon coordinate position written at step SP45 and channel data in the SRAM 36 in preparation for the time when the following user programs are selected.

As described above, until it is judged at step SP47 that one line call sign and the program name are written in the OSD area 25aA the variable N is incremented by 1 at the step SP50, and loop processing at steps SP44, SP45, SP46, SP47, and SP50 is repeated. When it is judged at step SP47 that one line is completed to be written, the variable L is incremented by 1 (In this case the variable L is set to L=2).

Then, at step SP49, it is judged whether or not the variable L is equal to 8 (it is judged whether or not the writing operation of 7 channels is completed). Since the variable L is set to L=2 in this case, after the setting of address N corresponding to the first program of the following line (channel), the process returns to step SP44 and following processing are repeated.

Thus, the seven call signs and program names are written by repeatedly performing the processing at steps SP44 and SP51. When the writing operation is completed, it is judged at step SP49 that the symbol L is given as L=8 and the processing is completed.

Incidentally, in the processing shown in FIG. 21, for simplicity, the display content was omitted. In actuality, all information items such as characters, logos or the like are written into the OSD area 25aA.

Figure 22:
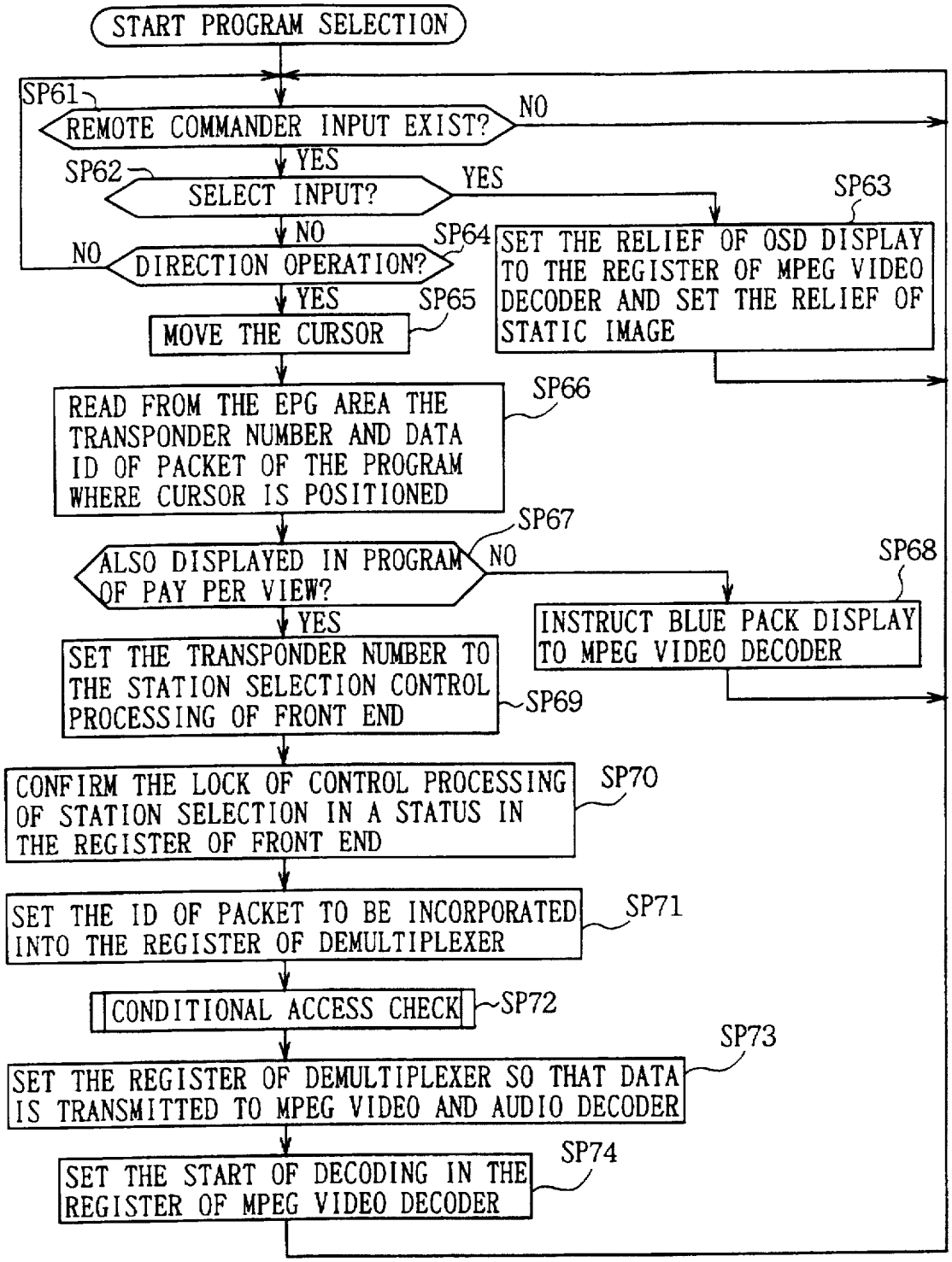
FIG. 22 is a flowchart illustrating a program selection treatment in the general guide display state.

Next, referring to a flowchart shown in FIG. 22, in a state in which a general guide shown in FIG. 20 is displayed, an explanation is given as to a processing for selecting a predetermined program. Users direct and select the select button switch 131 to move the cursor 212 onto the button icon where the predetermined program name is written. When the program selection is determined, the select button switch 131 is vertically operated (select operation).

In the beginning at step SP61, the process is in a waiting state until some input is performed from the remote commander 5. Then when the input is performed, the process proceeds to step SP62 to judge whether or not the input is the input of the select operation or not. When the input is not the input of the select operation, the process proceeds to step SP64 to judge whether or not the direction operation is performed. When it is judged that the direction operation is not performed, the button switch other than the button switch other than the select button switch 131 is operated with the result that no particular operation is not performed in such a case and returns to step SP61 to wait for the input from the next remote commander 5.

When it is judged at step SP64 that the select button switch 131 is directed and operated the process proceeds to step SP65 a processing is executed to move the cursor 212 in a direction corresponding to an operation direction. In other words, the bit map data writing position is changed onto a button icon corresponding to the operation of the select button switch 131.

Next, at step SP66, the transponder number of the program on the button icon where the cursor is positioned is obtained. This transponder number can be obtained by specifying a segment number from the channel list of the guide data thereby determining the transponder list from the segment number. Further, the data ID of the program is read from the Data IDs of the channel data.

Then the process proceeds to step SP67 to judge whether or not the program is displayed even when the program is a pay per view program. A predetermined message is displayed on the CRT 4A so that the determination is made by inputting YES or NO at each time. This complicates the whole operation. Then, for example, when the IRD2 is purchased, it is preliminarily input as to whether the program is displayed even when the program is a pay per view program. The preset information is memorized in EEPROM 38. Preferably, judgement at this step can be made from this memory.

When the program is not a pay per view program, and when it is judged that the program is displayed even when the program is a pay per view program, the process proceeds to step SP69. Then the transponder number read at step SP66 is set to a station selection control routine of the front end 20. As a consequence, the tuner 21 of the front end 20 receives the carrier wave of the transponder number set by the CPU 29. However, when the button icon at a position to which the cursor is moved is transmitted with the same carrier wave as data in the channel to which the button icon corresponds (when the transponder numbers of the two are the same), the switching of the carrier wave (frequency) is not required with the result that this process is skipped (through).

Then the process proceeds to step SP70 to confirm that the station selection control routine is locked from the status in the register of the front end 20 (not shown). In other words, it is confirmed that the carrier wave of the transponder number set at step SP69 is received. Then the process proceeds to step SP71 to set the ID (ID read at step SP66) of the packet to be incorporated into the register 24aA of the demultiplexer 24. As a consequence, the demultiplexer 24 extracts the packet of the program selected at step SP66 out of packets included in the carrier wave of transponder number set at step SP69, the front end 20 outputting the transponder number and stores it temporarily in the buffer area of the data buffer memory 35.

Then, at step SP72, the conventional access check is performed. In other words, since the pay per view programs are encoded, they are decoded. This processing is not needed with respect to programs which are not pay per view programs (programs which are not encoded). So this processing is skipped (through).

Next, the process proceeds to step SP73 to execute the predetermined setting in the register 24a of the demultiplexer 24 so that video data is supplied to the video decoder 25 and an audio data is transmitted to the MPEG audio decoder 26.

Next, at step SP74, the start of decoding is set to the registers (not shown) of MPEG video decoder 25 and of the MPEG audio decoder 26. As a consequence, the image data and the sound data of the program selected at step SP66 are decoded and output from the MPEG video decoder 25 and the MPEG audio decoder 26. The data is then supplied and displayed and then output as sound.

After that the process returns o step SP61 to wait for the next input from the remote commander 5. In the case where the cursor is further moved, the similar processing is executed repeatedly. Incidentally, in the case where a new cursor movement is input while the processing from step SP66 to step SP74 is executed, the processing up to that time is suspended and the processing corresponding to the new cursor movement will be initiated at once.

In the case where it is judged at step SP67 that the display of the pay per view program is not needed, the process proceeds to step SP68 and the output of a blue pack image is instructed to the MPEG video decoder 25.

As a consequence, in the case where the processing at step SP74 is performed, as a background image of the general guide shown in FIG. 20, the image of the program designated by the cursor 212 is displayed, and the sound signal accompanying the image program is output. In the meantime, in the case where the program designated by the cursor 212 is the pay view program, when the display is registered to be not required, the background image is completely blue, the sound is not output.

In the case where the program designated by the cursor is the pay view program, the program is not received in some cases. Thus the following case can be prevented. That is, while the desired program is selected, the program is received only when it happens that program passes on the icon on the program and fee is charged on users.

In this manner, the select button switch 131 is directed and operated to move the cursor to a predetermined position with the result that the instruction of receiving the program designated by the cursor 212 to the front end 20 immediately is output and the receiving operation is started. As a consequence, before selecting and operating the select button switch 131 to finally determine the predetermined program the receiving process of the program is already started. Consequently, when the select button switch 131 is selected and operated, the receiving of the program is already completed. Even if the receiving operation of the program is not completed, the program can be displayed on the monitor device 4 in a short time as compared with the case in which the receiving operation is started at that time.

In the case where it is judged at step SP62 that the select operation that is vertical operation is performed, the process proceeds to step SP63 to set the OSD display relief in the register of the MPEG video decoder 25. This relieves the display of the window screen of the general guide.

Further, at step SP63, the relief of the static image output set at step SP40 shown in FIG. 21 is also set. As a consequence, since the decoding of the screen after switching is started at step SP74, the channel image after switching is immediately displayed as a receiving channel after the static image is erased.

In this manner, in this embodiment, when the general guide is displayed, the background image is fixed as a static image. Then when the cursor is moved and a predetermined program is selected on the screen of the general guide, the screen of the general guide is erased, and at the same time, the selected channel image is displayed. Consequently, the disorder and the invisibility of the background screen can be prevented when the predetermined program is selected on the general guide screen.

In the aforementioned embodiment, in the display of the general guide screen, the channel image that has been displayed before is fixed as a static image. It is also possible to fix the background image as a static image when the cursor is moved on the general guide.

Figure 23:
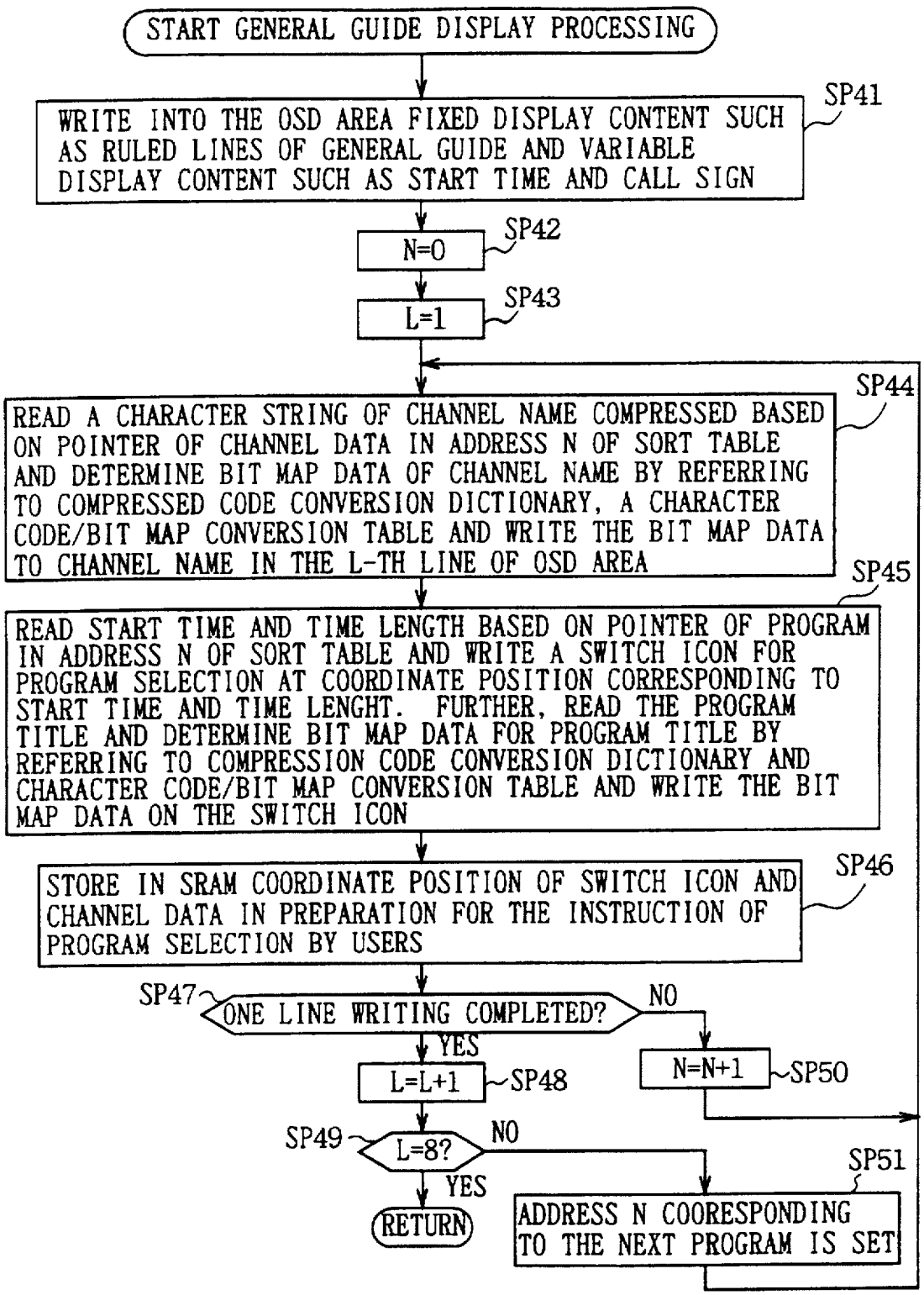
FIG. 23 is another flowchart showing the details of the general guide display treatment at step SP25.
Figure 24:
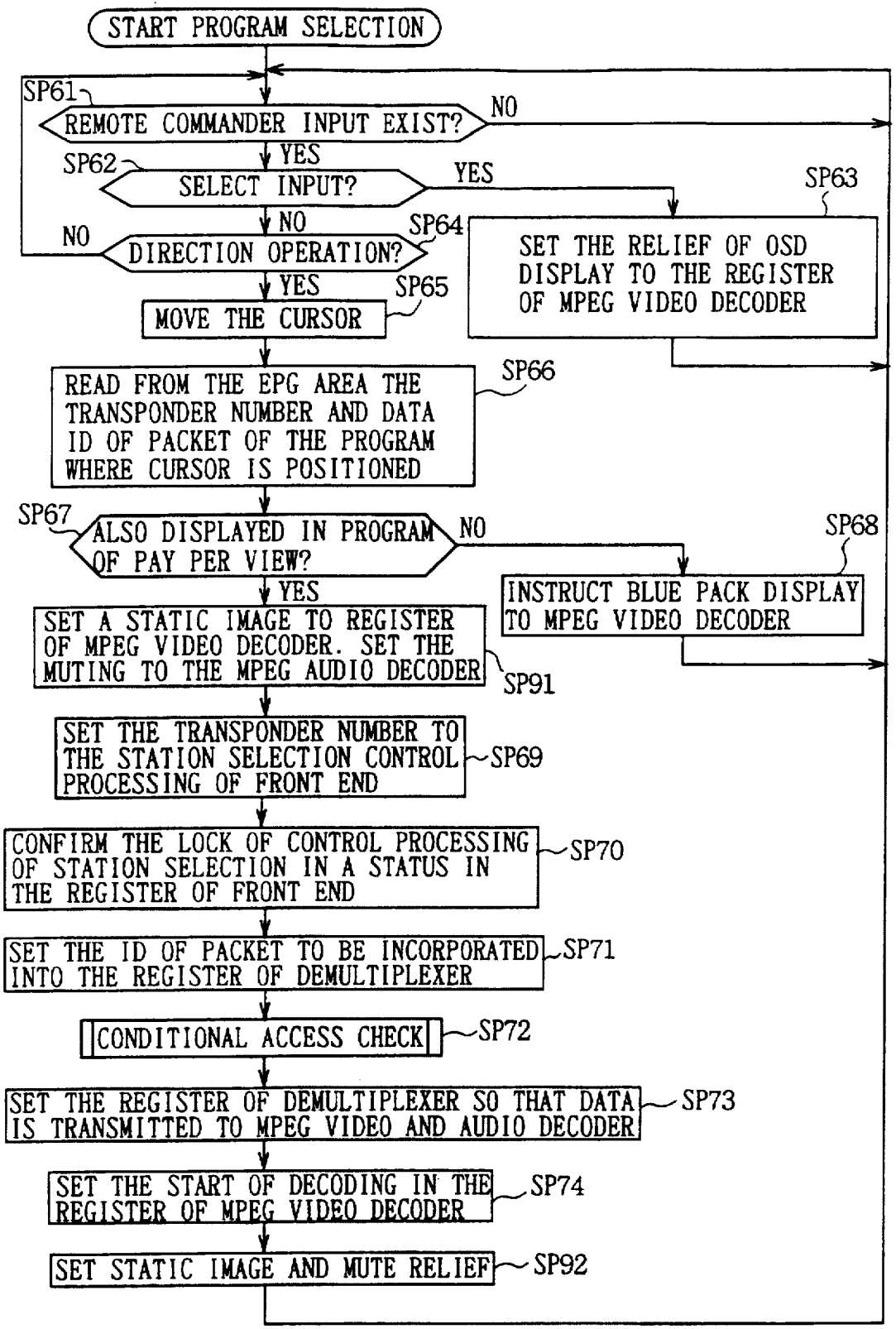
FIG. 24 is another flowchart illustrating a program selection treatment in the general guide display state.

FIGS. 23 and 24 show the processing examples in this case. FIG. 23 shows the processing which corresponds to the processing shown in FIG. 21. FIG. 24 shows the processing which corresponds to the processing shown in FIG. 22.

The general guide display processing shown in FIG. 23 is basically the same as the general guide display processing shown in FIG. 21. However, in FIG. 23, the processing at step SP40 shown in FIG. 21 is omitted. In other words, in this embodiment, when the general guide screen is displayed, the background image is not converted into a static image and remains as an animated image.

Next, the program selection processing shown in FIG. 24 will be explained. This program selection processing is basically the same as the program selection processing shown in FIG. 22. However, in the program processing shown in FIG. 24, step SP91 is inserted between steps SP67 and SP69. Between steps SP74 and SP61, step SP92 is inserted. Then the processing at step SP63 is converted into the processing at step SP93. Other processing in FIG. 24 are the same as the counterparts in FIG. 22.

That is, in this embodiment, the select button switch 131 is directed and operated and the cursor is moved at step SP65 so that data of the program corresponding to a button icon that has been moved is read at step SP66.

In the case where it is judged at step SP67 that the display of the program is set even if the program is a pay per view program, the process proceeds to step SP91 to set so that the image output to the register of the MPEG video decoder 25 becomes a static image and the audio output becomes mute in the register of the MPEG audio decoder 26. In other words, when the cursor is moved to a button icon of other program, the program displayed as an animated image before the cursor is moved is converted into a static image and the sound signal is muted.

Then at steps SP69 through SP74, the MPEG video decoder 25 and the MPEG audio decoder 26 execute the receiving processing of the program and decoding processing in correspondence to the button icon to which the cursor is moved.

Then, when these processing are completed, the process proceeds to step SP92 to relieve the static image setting and the mute setting carried out at step SP91. As a consequence, the static image which corresponds to the button icon before the cursor is moved and which has been displayed as a static image is converted into an animated image of the program after the cursor has been moved. Then, after that, the process returns to step SP61 to wait for the input from a new remote commander 5.

In the case where it is judged at step SP62 that the select button switch 131 is operated, the process proceeds to step SP93 to set the relief of OSD display to the register of the MPEG video decoder 25. This erases the screen of the general guide that has been displayed. Then the animated image of the program which corresponds to the already displayed button icon after the switching of the screen is displayed.

As described above, in this embodiment, when the cursor is moved to a new button icon, the image displayed on the background is given as a static image so that the receiving processing of the program corresponding to the button icon to which the cursor is moved is immediately started. Then when the receiving processing is completed, the static image is converted into an animated image of the program to which the cursor is moved. Therefore, users can surely recognize that the program has been switched compared with the aforementioned embodiment.

Incidentally, in the case where an operation is input at step SP65 for moving the cursor onto a new button icon before the processing of steps SP66 and SP92 is completed after the cursor has been moved onto a new button icon, these processing are interrupted. Then the processing with respect to the program (channel) which corresponds to the button icon to which the cursor has been moved is executed.

Further, in IRD 2 shown in FIG. 4, static image processing at the time of switching is executed in the case where the switching of the program (channel) is input by operperating the channel up and down button switch 133 of the remote commander 5 or in the case where a numeric button switch 138 is operated to input the channel number.

Figure 25:
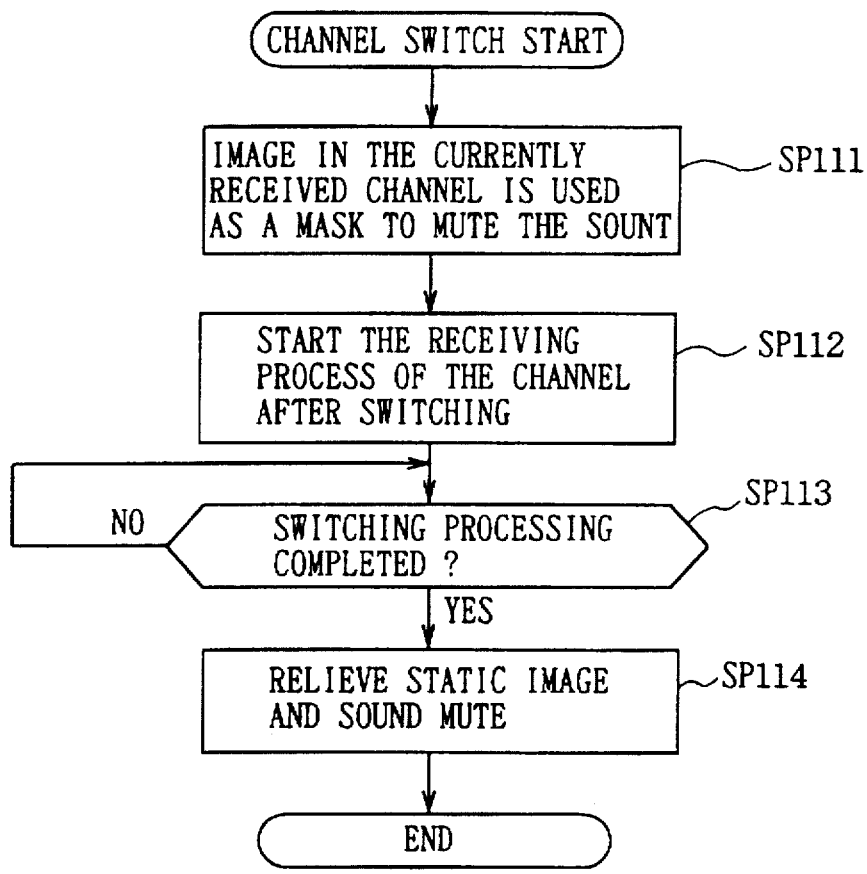
FIG. 25 is a flowchart showing a treatment at the time of the channel switching.

In other words, the channel (program) switching processing shown in a flowchart of FIG. 25 is executed by operating the channel up and down button switch 133 to input an instruction for moving up and down the channel or by operating the numeric button switch 138 to directly input the predetermined channel number.

At step SP111, the processing to convert the image of the program currently received into a static image and to mute the sound is executed. In other words, each process is set in the registers of the MPEG video decoder 25 and MPEG audio decoder 26. Therefore, the image that has been displayed becomes a static image and the sound signal is muted if channel switching is input.

Next, the process proceeds to step SP112 to start the receiving processing of the program (channel) after switching. In other words, the CPU 29 controls the front end 20 in response to the need of the demultiplexer 24 corresponding to the newly input channel to start the receiving processing of a new channel (channel after switching). At step SP113, the process waits until the processing of switching is completed. Then, the process proceeds to step SP114 upon the completion of the processing of switching to release the static image set at step SP111 and the mute of sound. In other words, at this time, the animated image of the channel after switching is displayed, and the sound signal corresponding to the animated image is output.

Therefore, at the time of channel switching, a disorder of images and an invisible state of the image can be prevented.

Figure 26:
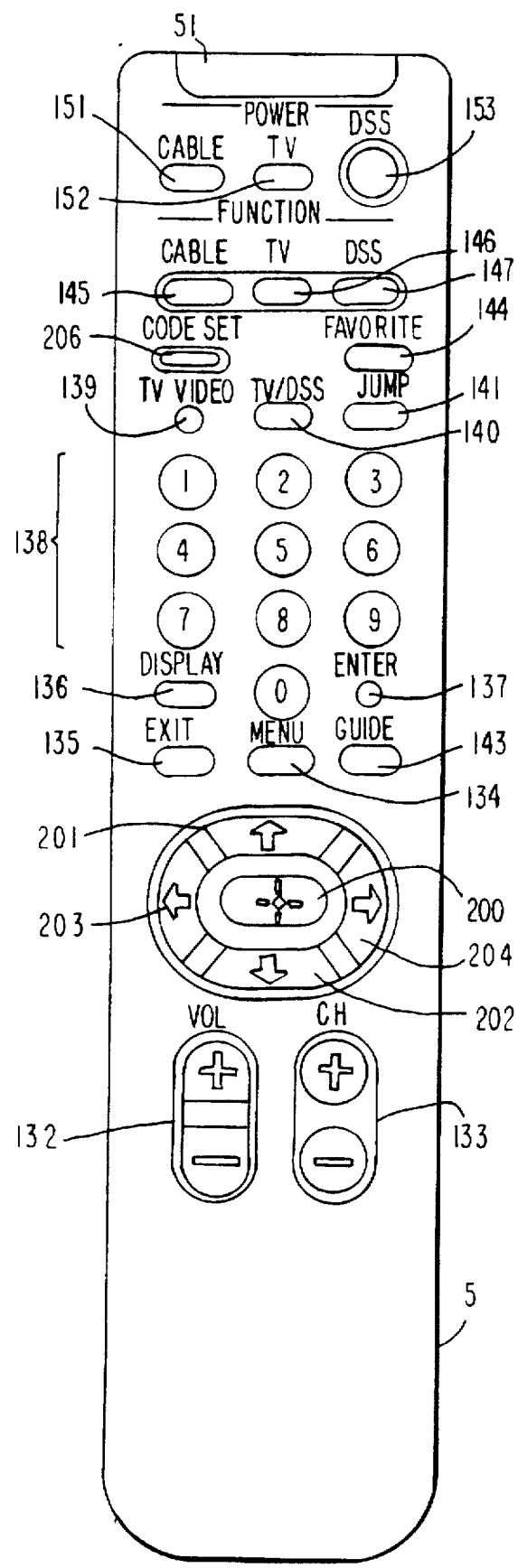
FIG. 26 is a plane view showing another structure example of a remote commander.

FIG. 26 shows other structure examples of the remote commander 5. In this embodiment, in place of the select button switch 131 shown in FIG. 5 which can be operated in eight directions, direction button switches 201 through 204 in the upward, downward, rightward and leftward directions and a button switch 200 that select operation can be done are provided. Further, in this embodiment, the cable button switch 145, the television button switch 146 and the DSS button switch 147 are provided in the inside illumination mode. The LED's 148 through 150 showing in FIG. 5 are omitted. The LED (not shown) arranged on the rear side of the button switches 145 through 147 are constituted so that they are lit in accordance with the operation thereof.

Other button switches are basically the same as the case shown in FIG. 5 though the arrangement and position thereof are different.

In the aforementioned embodiment, the cursor is displayed in a predetermined brightness, color or a blink. It is also possible to display the cursor with an arrow or the like independent of the button icon. The point is that the cursor functions as a pointer for designating a predetermined position.

Further, in the aforementioned embodiment, the program is selected in the general guide mode. The present invention can be applied to a case in which the program is selected in other modes.

Further the present invention is explained with respect to a case in which the invention is applied to the IRD2 which can be substantially incorporated in the monitor device 4 (television set).

In view of the above description of the present invention, it will be appreciated by those skilled in the art that many variations, modifications and changes can be made to the present invention without departing from the spirit or scope of the present invention as defined by the claims appended hereto. All such variations, modifications or changes are fully contemplated by the present invention.

What is claimed is:

1. A program switching apparatus comprising:
   receiving means for receiving a signal of a broadcast program;
   static image output means for freezing and temporarily outputting as a static image an image of said broadcast program;
   a switcher for selectively switching between an output of said receiving means and an output of said static image output means;
   control means for controlling said switcher, said static image output means and said receiving means so as to output said static image for a predetermined duration, after which the output of said static image is switched to said broadcast program signal received by said receiving means;

selection screen output means for selecting and displaying a selection screen having button icons corresponding to a plurality of programs as a window superimposed on said image of said broadcast program; and operating means for moving a cursor among said button icons on said selection screen and for selecting a program designated by said cursor, wherein said control means controls said receiving means to receive a program designated by said cursor while said cursor is moved on said selection screen by said operating means before a program is selected by said operating means, thereby receiving said program designated by said cursor before said program is selected for quickly switching to said selected program.

2. The program switching apparatus according to claim 1, wherein:

said control means controls completion of a receiving processing of said broadcast program by said receiving means when the switching of said received program is instructed, and wherein said control means controls said static image output means for switching the output of said static image after the receiving processing of said broadcast program is completed.

3. The program switching apparatus according to claim 1, further comprising display means for displaying an image of said broadcast program received by said receiving means.

4. The program switching apparatus according to claim 1, wherein said operating means is an up down button for incrementing and decrementing the channel of said program.

5. The program switching apparatus according to claim 1, wherein said operating means is a numeric keypad for inputting a channel number of said program.

6. The program switching apparatus according to claim 1, wherein:

said operating means comprises a cursor moving means for moving said cursor, and button icon selection means for selecting a button icon designated by said cursor.

7. The program switching apparatus according to claim 6, wherein said cursor moving means and said button icon selection means can be operated with one finger.

8. A program switching apparatus comprising:

receiving means for receiving a signal of a broadcast program;

static image output means for freezing and temporarily outputting as a static image an image of said broadcast program;

a switcher for selectively switching between the output of said receiving means and said static image output means;

control means for controlling said switcher, said static image output means and said receiving means so as to output said static image for a predetermined duration, after which the output of said static image is switched to said broadcast program signal received by said receiving means;

selection screen output means for selecting and displaying a selection screen having button icons corresponding to a plurality of programs as a window superimposed on said image of said broadcast program; and operating means for moving a cursor among said button icons on said selection screen and for selecting a program designated by said cursor, wherein said control means controls said receiving means to receive a program designated by said cursor while said cursor is moved on said selection screen by said operating means before a program is selected by said operating means, thereby receiving said program designated by said cursor before said program is selected for quickly making the switching to said selected program, and further wherein said static image output means mutes a sound signal when said static image is output, and said static image output means relieves the mute of said sound signal when said static image output is relieved.

9. A program switching apparatus for use in a digital television receiver, comprising:

receiving means for receiving a signal of a broadcast program;

static image output means for freezing and outputting as a static image an image of said broadcast program;

switching means for selectively switching between the output of said receiving means and said static image output means;

control means for controlling said switching means, said static image output means and said receiving means so as to output said static image for a predetermined duration, after which the output of said static image is switched to said broadcast program signal received by said receiving means;

selection window output means for selecting and displaying a program selection window having icons corresponding to a plurality of programs superimposed on said image of said broadcast program; and cursor moving means for moving a cursor among said icons on said selection window and for selecting a program designated by said cursor, wherein said control means controls said receiving means to receive a program designated by said cursor while said cursor is moved on said selection window by said cursor moving means before a program is selected by said cursor moving means, thereby receiving said program designated by said cursor before said program is selected for quickly making the switching to said selected program.

10. A television signal receiver for receiving a television signal for a desired channel program and outputting the received signal on a display as an image, said receiver comprising:

receiving means for receiving said television signal;

selection screen output means for displaying a selection screen on said display by producing a selection screen signal, wherein said selection screen is used to select a desired program out of a plurality of programs by moving a cursor on said selection screen;

cursor moving means for moving said cursor on said selection screen;

selection means for selecting a program designated by said cursor for display on said display; and control means for controlling said receiving means to receive the program designated by said cursor while said cursor is moved by said cursor moving means before said selection means is operated, thereby receiving said program designated by said cursor before said program is selected by said selection means for quickly making program changing, wherein said selection screen uses a window superimposed on said image received by said receiving means for displaying said plurality of programs when said selection screen output means is operated.

11. The television signal receiver according to claim 10, further comprising
sound signal output means for muting a sound signal of said program designated by said cursor and received by said receiving means under the control of said control means before said selection means is operated.

12. The television signal receiver according to claim 10, wherein
either one of a horizontal axis or a vertical axis of said selection screen is used a s an axis of a broadcast channel of said program while the other axis is used as a time axis with the result that button icons are arranged in a matrix for selecting said program at a position controlled by both axes.

13. The television signal receiver according to claim 12, wherein
said cursor is displayed by making a predetermined button icon of a different brightness or color from that of other button icons.

14. The television signal receiver according to claim 13, further comprising
memory means for memorizing information as to a display position of said button icon to be displayed on said selection screen broadcast as part of said television signal.

15. The television signal receiver according to claim 14, further comprising
judging means for judging whether a fee is charged when said program designated by said cursor is received.

16. The television signal receiver according to claim 15, further comprising
inhibiting means for inhibiting the receiving of said program when a fee is charged upon receipt of said program designated by said cursor.

17. The television receiver according to claim 16, wherein said receiving means comprises:
demodulating means for demodulating to a carrier wave to which an individual frequency is assigned a broadcast wave and which a digital image and sound information of said channel is demultiplexed; and
extracting means for extracting a signal of said channel instructed by said control means from a signal demodulated by said demodulating means;
wherein said control means instructs an extraction of said predetermined channel by said extracting means when said channel is switched within said carrier wave, said control means instructing a switching of the frequency of said carrier wave to said demodulating means when said channel is switched between different carrier waves while instructing the extraction of said predetermined channel by said extracting means.

18. A television signal receiver comprising:
receiving means for receiving a television signal of a predetermined channel;
display means for displaying an image of a program received by said receiving means;
selection screen output means for displaying a selection screen on said display means, wherein said selection screen is used to select a predetermined program out of a plurality of programs by moving a cursor on said selection screen;
cursor moving means for moving said cursor on said selection screen;
selection means for selecting a program designated by said cursor for display on said display means; and
control means for controlling said receiving means to receive the program designated by said cursor while said cursor is moved by said cursor moving means before said selection means is operated, thereby receiving said program designated by said cursor before said program is selected by said selection means for quickly making a program change, wherein
said selection screen uses a window superimposed on said image received by said receiving means for displaying said plurality of programs when said selection screen output means is operated.

19. The television signal receiver according to claim 18, further comprising
sound signal output means for muting a sound signal of said program designated by said cursor, said program being received by said receiving means in correspondence to the control of said control means before the operation of said selection means.

20. The television signal receiver according to claim 18, wherein
either one of a horizontal axis or a vertical axis of said selection screen constitutes a broadcast channel of said program while the other axis constitutes a time axis and button icons are arranged in matrix for selecting said program at a position controlled by both axes.

21. The television signal receiver according to claim 20, wherein
said cursor is displayed by making said button icons brightness or color different from a predetermined brightness and color.

22. The television signal receiver according to claim 21, further comprising
memory means for memorizing information with respect to the display position of said button icon displayed on said selection screen which is broadcast as part of said television signal.

23. The television signal receiver according to claim 22, further comprising
judging means for judging whether a fee is charged for receiving said program designated by said cursor.

24. The television signal receiver according to claim 23, further comprising
inhibiting means for inhibiting the receiving of said program when a fee is charged for receiving said program designated by said cursor.

25. The television signal receiver according to claim 18, wherein said receiving means comprises:
demodulating means for demodulating to a carrier wave to which an individual frequency is assigned a broadcast wave and which a digital image and sound information of said channel is demultiplexed; and
extracting means for extracting a signal of said channel instructed by said control means from a signal demodulated by said demodulating means;
wherein said control means instructs an extraction of said predetermined channel by said extracting means when said channel is switched in said same carrier wave, said control means instructing a switching of the frequency of said carrier wave to said demodulating means when said channel is switched between different carrier waves while instructing the extraction of said predetermined channel by said extracting means.

* * * * *